(12) United States Patent
Reimers

(10) Patent No.: US 10,570,224 B2
(45) Date of Patent: Feb. 25, 2020

(54) POLYMERIZATION USING A STRIPPING AGENT FOR DEVOLATILIZATION

(71) Applicant: ExxonMobil Chemical Patents Inc., Baytown, TX (US)

(72) Inventor: Jay L. Reimers, Houston, TX (US)

(73) Assignee: ExxonMobil Chemical Patents Inc., Baytown, TX (US)

( * ) Notice: Subject to any disclaimer, the term of this patent is extended or adjusted under 35 U.S.C. 154(b) by 301 days.

(21) Appl. No.: 15/446,536

(22) Filed: Mar. 1, 2017

(65) Prior Publication Data
US 2017/0298154 A1 Oct. 19, 2017

Related U.S. Application Data

(60) Provisional application No. 62/323,227, filed on Apr. 15, 2016.

(51) Int. Cl.
C08F 6/10 (2006.01)
C08L 23/00 (2006.01)
C08F 2/04 (2006.01)
C08F 6/00 (2006.01)
C08F 2/02 (2006.01)
C08F 2/06 (2006.01)

(52) U.S. Cl.
CPC .................... *C08F 6/005* (2013.01)

(58) Field of Classification Search
USPC ......................................................... 528/498
See application file for complete search history.

(56) References Cited

U.S. PATENT DOCUMENTS

| 6,410,683 | B1 | 6/2002 | Craig | |
| 7,902,325 | B2 * | 3/2011 | Blackmon | C08F 6/02 528/495 |
| 8,207,291 | B2 | 6/2012 | Galewski | |

FOREIGN PATENT DOCUMENTS

| EP | 0 027 700 | 4/1981 |
| EP | 0 914 355 | 5/1999 |
| EP | 2 014 684 | 1/2009 |
| WO | 98/03560 | 1/1998 |

* cited by examiner

Primary Examiner — Fred M Teskin

(57) ABSTRACT

This disclosure describes processes for producing polymer using non-polar and condensable stripping agents to remove volatile components, such as solvent and unreacted monomer, from the produced polymer. Systems for performing these processes are also disclosed.

25 Claims, 2 Drawing Sheets

POLYMERIZATION USING A STRIPPING AGENT FOR DEVOLATILIZATION

CROSS-REFERENCE OF RELATED APPLICATIONS

This invention claims priority to and the benefit of U.S. Patent Application Ser. No. 62/323,227, filed Apr. 15, 2016, which is herein incorporated by reference.

FIELD OF THE INVENTION

This disclosure describes novel polymerization processes and systems using a stripping agent for devolatilization of polymer.

BACKGROUND OF THE INVENTION

Polymerization processes for producing polymers, such as polyolefins, typically require removal of unreacted monomers and solvents from final product. The monomers and solvents are often subsequently recycled back into the polymerization process. Usually, removal of the monomers and solvents is achieved through devolatilization of the polymerizate stream exiting the reactor, such as a molten polymer stream. Devolatilization of polymers is typically achieved by both raising the temperature and lowering the partial pressure of the volatile components. Lowering partial pressure can be accomplished by using a vacuum or by introducing a gaseous diluent at a fixed total pressure. Examples of gaseous diluents, also known as stripping agents, include steam, carbon dioxide, water, and methanol. However, such gaseous diluents can poison the catalyst system; thus, further processing steps are required to remove those gaseous diluents from a recycle stream containing monomer and solvent before the recycle stream can be introduced back into the polymerization step. For example, if a non-condensable gaseous diluent, such as nitrogen, is used, a further process step of venting is required to avoid build-up of nitrogen in the system. However, venting of nitrogen can also result in loss of other desired volatile species, such as monomers, which can be vented along with nitrogen. Additionally, when using gaseous diluents, such as water and methanol, a further separation and removal process is needed to remove water and methanol from a condensed overhead stream resulting in additional cost and time during the polymerization process.

Thus, there is a need in the art for new and improved polymerization processes where devolatilization of the polymer can be achieved with stripping agents that do not poison the catalyst systems, and subsequently can be recycled back into the polymerization process without further processing steps. The present disclosure provides polymerization processes where devolatilization of the polymer is achieved by a non-polar and condensable stripping agent that does not require removal from the process and can be recycled back to the polymerization step.

SUMMARY OF THE INVENTION

This disclosure relates to a process for producing a polyolefin, wherein the process comprises polymerizing a hydrocarbon monomer dissolved in a solvent in the presence of a catalyst system under conditions to obtain a first effluent comprising a solution of the polyolefin and the solvent; performing a first liquid vapor separation in a first vessel on the first effluent to produce a second effluent comprising a solution having a higher concentration of the polyolefin and a lower concentration of the solvent than the first effluent; and performing a second liquid vapor separation in a second vessel on the second effluent to produce: a first stream comprising molten polyolefin substantially free of the solvent and unreacted hydrocarbon monomer; and a second stream comprising the solvent and the unreacted hydrocarbon monomer; wherein the second liquid vapor separation comprises adding a stripping agent to the second effluent in the second vessel to remove the solvent and the unreacted hydrocarbon monomer from the polyolefin, wherein the stripping agent is non-polar and condensable.

DETAILED DESCRIPTION OF THE INVENTION

I. Definitions

Figure 1:
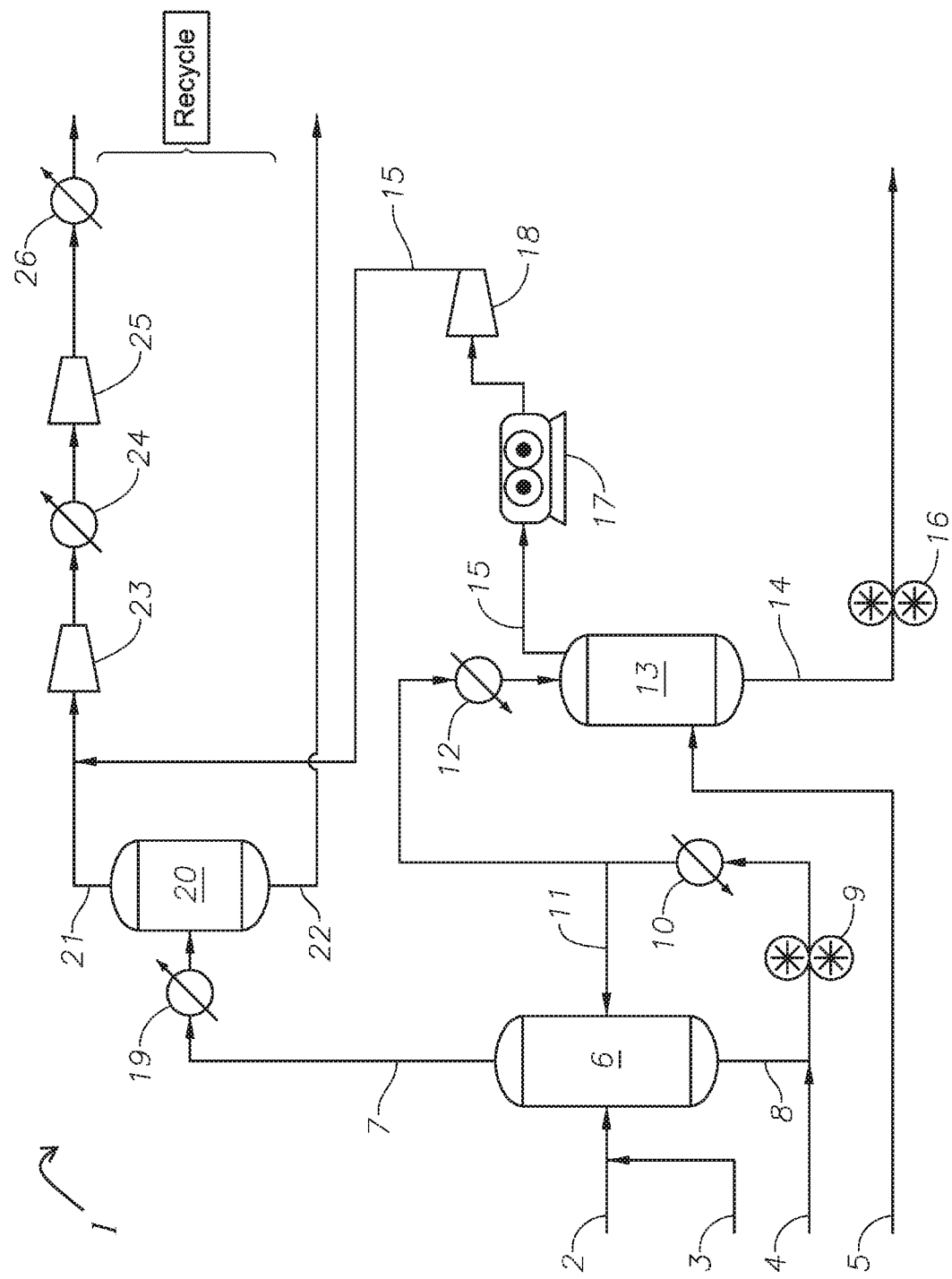
FIG. 1 is a diagram of a polymerization process system.

For the purposes of this disclosure and the claims thereto, the new numbering scheme for the Periodic Table Groups is used as described in CHEMICAL AND ENGINEERING NEWS, 63 (5), pg. 27 (1985).

As used herein, the phrase "at least a portion of" means greater than 0 to 100.0 wt % of the composition to which the phrase refers. The phrase "at least a portion of" refers to an amount ≤about 1.0 wt %, ≤about 2.0 wt %, ≤about 5.0 wt %, ≤about 10.0 wt %, ≤about 20.0 wt %, ≤about 25.0 wt %, ≤about 30.0 wt %, ≤about 40.0 wt %, ≤about 50.0 wt %, ≤about 60.0 wt %, ≤about 70.0 wt %, ≤about 75.0 wt %, ≤about 80.0 wt %, ≤about 90.0 wt %, ≤about 95.0 wt %, ≤about 98.0 wt %, ≤about 99.0 wt %, or ≤about 100.0 wt %.

A "reaction zone" also referred to as a "polymerization zone" is a vessel where polymerization takes place, for example a batch reactor or continuous reactor. When multiple reactors are used in either series or parallel configuration, each reactor may be considered as a separate reaction zone or a separate polymerization zone. Alternatively, a reactor may include one or more reaction zones or polymerization zones. For a multi-stage polymerization in both a batch reactor and a continuous reactor, each polymerization stage is considered as a separate polymerization zone.

As used herein, the term "paraffin," alternatively referred to as "alkane," refers to a linear, branched, or cyclic compound of carbon and hydrogen having no unsaturations (e.g., double or triple bonds), preferably a saturated hydrocarbon of 1 to about 25 carbon atoms in length, such as, but not limited to methane, ethane, propane and butane. The paraffin may be straight-chain or branched-chain. "Paraffin" is intended to embrace all structural isomeric forms of paraffins. As used herein, the term "light paraffin" refers to paraffins having 1 to 4 carbon atoms (i.e., methane, ethane, propane and butane).

An "olefin," alternatively referred to as "alkene," is a linear, branched, or cyclic compound of carbon and hydrogen having at least one double bond. For purposes of this specification and the claims appended thereto, when a polymer or copolymer is referred to as comprising an olefin, the olefin present in such polymer or copolymer is the polymerized form of the olefin. For example, when a copolymer is said to have an "ethylene" content of 35 wt % to 55 wt %, it is understood that the mer unit in the copolymer is derived from ethylene in the polymerization reaction and said derived units are present at 35 wt % to 55 wt %, based upon the weight of the copolymer. A "polymer" has two or more of the same or different mer units. A "homopolymer" is a polymer having mer units that are the same. A "copolymer" is a polymer having two or more mer units that are different from each other. A "terpolymer" is a polymer having three mer units that are different from each other. "Different" as used to refer to mer units indicates that the mer units differ from each other by at least one atom or are different isomerically. Accordingly, the definition of copolymer, as used herein, includes terpolymers and the like. An "ethylene polymer" or "ethylene copolymer" is a polymer or copolymer comprising at least 50 mole % ethylene derived units, a "propylene polymer" or "propylene copolymer" is a polymer or copolymer comprising at least 50 mole % propylene derived units, a "butene polymer" or "butene copolymer" is a polymer or copolymer comprising at least 50 mole % butene derived units, and so on.

For the purposes of this disclosure, ethylene shall be considered an α-olefin.

For purposes of this disclosure and claims thereto, unless otherwise indicated, the term "substituted" means that a hydrogen group has been replaced with a heteroatom, or a heteroatom containing group. For example, a "substituted hydrocarbyl" is a radical made of carbon and hydrogen where at least one hydrogen is replaced by a heteroatom or heteroatom containing group.

As used herein, $M_n$ is number average molecular weight, $M_w$ is weight average molecular weight, and $M_z$ is z average molecular weight, wt % is weight percent, and mol % is mole percent. Molecular weight distribution (MWD), also referred to as polydispersity index (PDI), is defined to be $M_w$ divided by $M_n$. Unless otherwise noted, all molecular weight units (e.g., $M_w$, $M_n$, $M_z$) are g/mol.

An "anionic ligand" is a negatively charged ligand which donates one or more pairs of electrons to a metal ion. A "neutral donor ligand" is a neutrally charged ligand which donates one or more pairs of electrons to a metal ion.

"Alkoxy" or "alkoxide" refers to —O-alkyl containing from 1 to about 10 carbon atoms. The alkoxy may be straight-chain, branched-chain or cyclic. Non-limiting examples include methoxy, ethoxy, propoxy, butoxy, isobutoxy, tert-butoxy, pentoxy, and hexoxy. "$C_1$ alkoxy" refers to methoxy, "$C_2$ alkoxy" refers to ethoxy, "$C_3$ alkoxy" refers to propoxy and "$C_4$ alkoxy" refers to butoxy.

The terms "hydrocarbyl radical," "hydrocarbyl," "hydrocarbyl group," "alkyl radical," and "alkyl" are used interchangeably throughout this document. Likewise, the terms "group," "radical," and "substituent" are also used interchangeably in this document. For purposes of this disclosure, "hydrocarbyl radical" is defined to be $C_1$-$C_{100}$ radicals, that may be linear, branched, or cyclic, and when cyclic, aromatic or non-aromatic. Examples of such radicals include, but are not limited to, methyl, ethyl, n-propyl, isopropyl, n-butyl, isobutyl, sec-butyl, tert-butyl, pentyl, iso-amyl, hexyl, octyl cyclopropyl, cyclobutyl, cyclopentyl, cyclohexyl, cyclooctyl, and the like including their substituted analogues. Substituted hydrocarbyl radicals are radicals in which at least one hydrogen atom of the hydrocarbyl radical has been substituted with at least one heteroatom or heteroatom containing group, such as halogen (such as Br, Cl, F, or I) or at least one functional group such as $NR^*_2$, $OR^*$, $SeR^*$, $TeR^*$, $PR^*_2$, $AsR^*_2$, $SbR^*_2$, $SR^*$, $BR^*_2$, $SiR^*_3$, $GeR^*_3$, $SnR^*_3$, $PbR^*_3$, and the like, or where at least one heteroatom has been inserted within a hydrocarbyl ring.

Unless otherwise indicated, the term "light" refers to hydrocarbyls having 1 to 4 carbon atoms and the term "heavy" refers to hydrocarbyls having 5 or more carbon atoms.

The term "aryl" or "aryl group" means a six carbon aromatic ring and the substituted variants thereof, including but not limited to, phenyl, 2-methyl-phenyl, xylyl, 4-bromo-xylyl. Likewise heteroaryl means an aryl group where a ring carbon atom (or two or three ring carbon atoms) has been replaced with a heteroatom, preferably N, O, or S. As used herein, the term "aromatic" also refers to pseudoaromatic heterocycles which are heterocyclic substituents that have similar properties and structures (nearly planar) to aromatic heterocyclic ligands, but are not by definition aromatic; likewise the term "aromatic" also refers to substituted aromatics.

Unless otherwise indicated, where isomers of a named alkyl, alkenyl, alkoxy, or aryl group exist (e.g., n-butyl, iso-butyl, sec-butyl, and tert-butyl) reference to one member of the group (e.g., n-butyl) shall expressly disclose the remaining isomers (e.g., iso-butyl, sec-butyl, and tert-butyl) in the family. Likewise, reference to an alkyl, alkenyl, alkoxide, or aryl group without specifying a particular isomer (e.g., butyl) expressly discloses all isomers (e.g., n-butyl, iso-butyl, sec-butyl, and tert-butyl).

The term "ring atom" means an atom that is part of a cyclic ring structure. By this definition, a benzyl group has six ring atoms and tetrahydrofuran has 5 ring atoms.

A heterocyclic ring is a ring having a heteroatom in the ring structure as opposed to a heteroatom substituted ring where a hydrogen on a ring atom is replaced with a heteroatom. For example, tetrahydrofuran is a heterocyclic ring and 4-N,N-dimethylamino-phenyl is a heteroatom substituted ring.

The term "continuous" means a system that operates without interruption or cessation. For example a continuous process to produce a polymer would be one where the reactants are continually introduced into one or more reactors and polymer product is continually withdrawn.

A "solution polymerization" means a polymerization process in which the polymer is dissolved in a liquid polymerization medium, such as an inert solvent or monomer(s) or their blends. A solution polymerization is typically homogeneous. A homogeneous polymerization process is defined to be a process where at least 90 wt % of the product is soluble in the reaction media. Such systems are preferably not turbid as described in J. Vladimir Oliveira, C. Dariva and J. C. Pinto, Ind. Eng. Chem. Res. 29, 2000, 4627.

A "bulk polymerization" means a polymerization process in which the monomers and/or comonomers being polymerized are used as a solvent or diluent using little or no inert solvent as a solvent or diluent. A small fraction of inert solvent might be used as a carrier for a catalyst and a scavenger. A bulk polymerization system contains less than 25 wt % of inert solvent or diluent, preferably less than 10 wt %, preferably less than 1 wt %, preferably 0 wt %.

As used herein, "molten" refers to any material or mixture of materials that is in a fluid state.

As used herein, the term "counter-current" refers to a flow of two streams (e.g., stream (a), stream (b)) in substantially opposing directions. For example, if stream (a) flows from a top portion to a bottom portion of a vessel or at least one reaction zone and stream (b) flows from a bottom portion to a top portion of the vessel or the at least one reaction zone, the flow of stream (a) would be considered counter-current to the flow of stream (b). On a smaller scale within the vessel or reaction zone, there may be regions where flow may not be counter-current.

II. Polymerization Process

A. Polymerizing Step

This disclosure relates to a polymerization process for producing polymer (e.g., polyolefin) comprising polymerizing a hydrocarbon monomer in the presence of a catalyst system under conditions to obtain a first effluent comprising polymer (e.g., polyolefin).

This disclosure relates to a process for producing a polyolefin, wherein the process comprises polymerizing a hydrocarbon monomer dissolved in a solvent in the presence of a catalyst system under conditions to obtain an effluent comprising a solution of the polyolefin and the solvent; performing a liquid vapor separation in a vessel on the effluent to produce: a first stream comprising molten polyolefin substantially free of the solvent and unreacted hydrocarbon monomer; and a second stream comprising the solvent and the unreacted hydrocarbon monomer; wherein the liquid vapor separation comprises adding a stripping agent to the effluent in the vessel to remove the solvent and the unreacted hydrocarbon monomer from the polyolefin, wherein the stripping agent is non-polar and condensable.

The polymerization processes described herein may be carried out in any manner known in the art. Any solution, suspension, slurry, or gas phase polymerization process known in the art can be used. Such processes can be run in a batch, semi-batch, or continuous mode. Preferably, the polymerization process is continuous. Homogeneous polymerization processes (such as solution phase and bulk phase processes) are advantageous. A desirable bulk process is one where monomer concentration in all feeds to the reactor is 70 volume % or more. In useful bulk polymerization systems, no solvent or diluent is present or added in the reaction medium, (except for the small amounts used as the carrier for the catalyst system or other additives, or amounts typically found with the monomer; e.g., propane in propylene).

Usefully, the polymerization process is not a slurry process.

Alternately, the polymerization process may be a slurry process. As used herein, the term "slurry polymerization process" means a polymerization process where a supported catalyst is employed and monomers are polymerized on the supported catalyst particles and at least 95 wt % of polymer products derived from the supported catalyst are in granular form as solid particles (not dissolved in the diluent).

A slurry polymerization process generally operates between 1 to about 50 atmosphere pressure range (15 psi to 735 psi, 103 kPa to 5068 kPa) or even greater and temperatures in the range of 0° C. to about 120° C. In a slurry polymerization, a suspension of solid, particulate polymer is formed in a liquid polymerization diluent medium to which monomer and comonomers along with catalyst are added. The suspension including diluent is intermittently or continuously removed from the reactor where the volatile components are separated from the polymer and recycled, optionally after a distillation, to the reactor. The liquid diluent employed in the polymerization medium is typically an alkane having from 3 to 7 carbon atoms, preferably a branched alkane. The medium employed should be liquid under the conditions of polymerization and relatively inert. When a propane medium is used the process must be operated above the reaction diluent critical temperature and pressure. Preferably, a hexane or an isobutane medium is employed.

One embodiment of the processes and systems disclosed herein involves a particle form polymerization, or a slurry process where the temperature is kept below the temperature at which the polymer goes into solution. Such technique is well known in the art, and described in, for instance, U.S. Pat. No. 3,248,179; which is fully incorporated herein by reference. The preferred temperature in the particle form process is within the range of about 85° C. to about 110° C.

Advantageously, the polymerization process may be a solution polymerization process, preferably a solution process where the monomer and catalyst system are contacted in a solution phase and polymer is obtained therein.

In various aspects, a solvent may be present during the polymerization process, such as in a solution process. Suitable diluents/solvents for polymerization include non-coordinating, inert liquids. Examples include straight and branched-chain hydrocarbons, such as isobutane, butane, pentane, isopentane, hexane, isohexane, heptane, octane, dodecane, and mixtures thereof; cyclic and alicyclic hydrocarbons, such as cyclohexane, cycloheptane, methylcyclohexane, methylcycloheptane, and mixtures thereof, such as can be found commercially (Isopar™); perhalogenated hydrocarbons, such as perfluorinated $C_{4-10}$ alkanes, chlorobenzene, and aromatic and alkylsubstituted aromatic compounds, such as benzene, toluene, mesitylene, and xylene. Suitable solvents also include liquid olefins which may act as monomers or comonomers including ethylene, propylene, 1-butene, 1-hexene, 1-pentene, 3-methyl-1-pentene, 4-methyl-1-pentene, 1-octene, 1-decene, and mixtures thereof. In a preferred embodiment, aliphatic hydrocarbon solvents are used as the solvent, such as isobutane, butane, pentane, isopentane, hexane, isohexane, heptane, octane, dodecane, and mixtures thereof; cyclic and alicyclic hydrocarbons, such as cyclohexane, cycloheptane, methylcyclohexane, methylcycloheptane, and mixtures thereof. In another embodiment, the solvent is not aromatic, preferably aromatics are present in the solvent at less than 1 wt %, preferably less than 0.5 wt %, preferably 0 wt % based upon the weight of the solvents.

In an embodiment of the invention, the feed concentration of the monomers and comonomers for the polymerization comprises 60 vol. % solvent or less, preferably 40 vol. % or less, or preferably 20 vol. % or less, based on the total volume of the feedstream. Preferably the polymerization is run in a bulk process.

In various aspects where the polymerization process is a solution polymerization, the process may comprise polymerizing a hydrocarbon monomer dissolved in a solvent as described herein in the presence of a catalyst system under conditions to obtain a first effluent comprising a solution of polymer (e.g., polyolefin) and solvent and/or unreacted hydrocarbon monomer. The first effluent may comprise a solution of polymer (e.g. polyolefin) in an amount of at least about 5.0 wt % polymer, at least about 10 wt % polymer, at least about 15 wt % polymer, at least about 20 wt % polymer, at least about 25 wt % polymer, at least about 30 wt % polymer, at least about 35 wt % polymer, at least about 40 wt % polymer, at least about 45 wt % polymer or least about 50 wt % polymer, based upon the weight of polymer, solvent and unreacted monomers. Additionally or alternatively, the first effluent may comprise a solution of polymer (e.g., polyolefin) in an amount of about 5.0 wt % to about 50 wt % polymer, about 5.0 wt % to about 40 wt % polymer, about 10 wt % to about 40 wt % polymer, about 10 wt % to about 30 wt % polymer or about 15 wt % to about 30 wt % polymer, based upon the weight of polymer, solvent and unreacted monomers.

The first effluent is then contacted with a stripping agent to produce a polymer solution which polymer (e.g., polyolefin) in an amount of at least about 10 wt % polymer, at least about 15 wt % polymer, at least about 20 wt % polymer, at least about 25 wt % polymer, at least about 30 wt % polymer, at least about 35 wt % polymer, at least about 40 wt % polymer, at least about 45 wt % polymer or least about 50 wt % polymer, based upon the weight of polymer, solvent and unreacted monomers. Additionally or alternatively, the polymer solution comprises polymer (e.g., polyolefin) in an amount of about 10.0 wt % to about 100 wt % polymer, about 15.0 wt % to about 90 wt % polymer, about 20 wt % to about 80 wt % polymer, based upon the weight of polymer, solvent and unreacted monomers.

In an embodiment of the invention, the first effluent is subjected to vapor liquid separation before contacting with the stripping agent.

In an embodiment of the invention, the first effluent is subjected to vapor liquid separation before and during contacting with the stripping agent.

Particularly, the first effluent comprises a solution of: 1) polymer (e.g., polyolefin) present in an amount of about 10 wt % to about 30 wt %, and 2) solvent and unreacted hydrocarbon monomer present in amount of about 70 wt % to about 90 wt %, based upon the weight of the solvent, unreacted hydrocarbon monomer and polymer.

The polymerization processes may be conducted under conditions including a temperature of about 50° C. to about 220° C., preferably about 70° C. to about 210° C., preferably about 90° C. to about 200° C., preferably from 100° C. to 190° C., preferably from 130° C. to 160° C. The polymerization process may be conducted at a pressure of from about 120 to about 1800 psi (0.83 to 12.4 MPa), preferably from 200 to 1000 psi (1.4 to 6.9 MPa), preferably from 300 to 600 psi (2.1 to 4.1 MPa). Preferably, the pressure is about 450 psi (3.1 MPa).

In some embodiments, hydrogen may be present during the polymerization process at a partial pressure of 0.001 to 50 psig (0.007 to 345 kPa), preferably from 0.01 to 25 psig (0.07 to 172 kPa), more preferably 0.1 to 10 psig (0.7 to 70 kPa).

B. Liquid Vapor Separation

The solvent and/or unreacted hydrocarbon monomer present in the first effluent with polymer (e.g., polyolefin) is preferably removed from the first effluent. Thus, the process described herein comprises performing at least a first liquid vapor separation step on the first effluent. In particular, a first liquid vapor separation may be performed in a first vessel on the first effluent under suitable conditions to produce a second effluent comprising a solution having a higher concentration of polymer (e.g., polyolefin) and a lower concentration of the solvent and/or the unreacted hydrocarbon monomer. The liquid vapor separation may be performed in any suitable vessel or reactor, e.g., a flash reactor, high pressure flash vessel, etc.

In various aspects, the second effluent comprises a solution of polymer (e.g., polyolefin) comprising at least about 50 wt % polymer, at least about 55 wt % polymer, at least about 60 wt % polymer, at least about 65 wt % polymer, at least about 70 wt % polymer, at least about 75 wt % polymer, at least about 80 wt % polymer, at least about 85 wt % polymer, at least about 90 wt % polymer or least about 95 wt % polymer, based upon the weight of the polymer solvent and unreacted monomer. Alternatively, the second effluent comprises a solution of polymer (e.g., polyolefin) comprising about 50 wt % to about 95 wt % polymer, about 60 wt % to about 95 wt % polymer, about 70 wt % to about 95 wt % polymer, about 70 wt % to about 90 wt % polymer, or about 75 wt % to about 90 wt % polymer, based upon the weight of the solvent, the unreacted monomer, and the polymer.

Additionally or alternatively, the second effluent comprises solvent and/or unreacted hydrocarbon monomer, preferably solvent and unreacted hydrocarbon monomer, in an amount of at least about 5.0 wt %, at least about 10 wt %, at least about 15 wt %, at least about 20 wt %, at least about 25 wt %, at least about 30 wt %, at least about 35 wt %, at least about 40 wt %, at least about 45 wt % or least about 50 wt %, based upon the weight of the solvent, polymer and unreacted hydrocarbon monomer. Alternatively, the second effluent comprises a solution of solvent and/or unreacted hydrocarbon monomer, preferably solvent and unreacted hydrocarbon monomer, in an amount of about 5.0 wt % to about 50 wt %, about 5.0 wt % to about 40 wt %, about 10 wt % to about 40 wt %, about 10 wt % to about 30 wt % or about 15 wt % to about 30 wt %, based upon the weight of the solvent, polymer, and unreacted hydrocarbon monomer.

Preferably, the second effluent comprises a solution of: 1) polymer (e.g., polyolefin) present in an amount of about 70 wt % to about 90 wt %, and 2) solvent and unreacted hydrocarbon monomer in amount of about 10 wt % to about 30 wt %, based upon the weight of the solvent, unreacted hydrocarbon monomer and polymer.

The first liquid vapor separation may be conducted under conditions including a temperature of from about 80° C. to about 250° C., preferably about 90° C. to about 250° C., preferably about 95° C. to about 225° C., or preferably about 100° C. to about 200° C. Additionally or alternatively, the first liquid vapor separation may be conducted with a pressure of about 2000 torr (267 kPa) to about 6500 torr (867 kPa), preferably about 2200 torr (293 kPa) to about 6300 torr (840 kPa), preferably about 2500 torr (333 kPa) to about 6000 torr (800 kPa), or preferably about 2500 torr (333 kPa) to about 5600 torr (747 kPa).

Additionally or alternatively, the process described herein may further comprise performing a second liquid vapor separation on the second effluent. Optionally, the second effluent may be heated (e.g., in a heat exchanger) prior to the second liquid vapor separation. The second liquid vapor separation may be performed in a second vessel, such as a flash vessel under suitable conditions to produce a first stream comprising molten polymer (e.g., polyolefin), preferably substantially free of solvent and/or unreacted hydrocarbon monomer and a second stream comprising solvent and/or unreacted hydrocarbon monomer. Additionally, the second liquid vapor separation may comprise adding a stripping agent to the second effluent to remove the solvent and/or unreacted hydrocarbon monomer from polymer (e.g., polyolefin). Advantageously, the stripping agent may be added directly to the second vessel as opposed to adding the stripping agent to the effluent stream before it enters the second vessel.

In various aspects, the first stream exiting the second liquid vapor separation comprises molten polymer (e.g., polyolefin) in an amount of at least about 80 wt % polymer, at least about 85 wt % polymer, at least about 90 wt % polymer, at least about 95 wt % polymer, at least about 98 wt % polymer, at least about 99 wt % polymer, at least about 99.5 wt % polymer, at least about 99.8 wt % polymer, or least about 99.9 wt % polymer, based upon the weight of the first stream exiting the second liquid vapor separation.

Alternatively, the first stream exiting the second liquid vapor separation comprises molten polymer (e.g., polyolefin) in an amount of about 80 wt % to about 99.9 wt % polymer, about 95 wt % to about 99.9 wt % polymer, about 98 wt % to about 99.9 wt % polymer, or about 98 wt % to about 99.8 wt % polymer, based upon the weight of the first stream exiting the second liquid vapor separation.

Additionally or alternatively, the first stream exiting the second liquid vapor separation comprises less than 20 wt % solvent and unreacted hydrocarbon monomer, alternately less than about 15 wt %, alternately less than about 10 wt %, alternately less than about 5.0 wt %, alternately less than about 2.0 wt %, alternately less than about 1.0 wt %, alternately less than about 0.50 wt %, alternately less than about 0.20 wt %, or alternately less than about 0.10 wt %, based upon the weight of the first stream exiting the second liquid vapor separation. Additionally or alternatively, the first stream exiting the second liquid vapor separation comprises solvent and unreacted hydrocarbon monomer in an amount of about 0.10 wt % to about 20 wt %, about 0.10 wt % to about 10 wt %, about 0.10 wt % to about 5.0 wt %, about 0.10 wt % to about 2.0 wt % or about 0.10 wt % to about 1.0 wt %, based upon the weight of the first stream exiting the second liquid vapor separation.

Particularly, the first stream exiting the second liquid vapor separation comprises at least about 98 wt % molten polymer (e.g., polyolefin) and less than about 2.0 wt % solvent and unreacted hydrocarbon monomer, based upon the weight of the first stream exiting the second liquid vapor separation.

The second liquid vapor separation may be conducted at a lower pressure than the first liquid vapor separation and optionally at substantially constant pressure. Additionally or alternatively, the second liquid vapor separation may be conducted under a vacuum. In particular, the second liquid vapor separation may be conducted with a pressure of about 0.5 torr (6 Pa) to about 300 torr (40 kPa), about 0.5 torr (6 Pa) to about 200 torr (27 kPa), about 25 torr (3 kPa) to about 300 torr (40 kPa), about 25 torr (3 kPa) to about 200 torr (27 kPa), about 50 torr (6 kPa) to about 300 torr (40 kPa), about 75 torr (10 kPa) to about 250 torr (33 kPa), about 100 torr (13 kPa) to about 250 torr (33 kPa), about 100 torr (13 kPa) to about 250 torr (33 kPa) or about 100 torr (13 kPa) to about 200 torr (27 kPa). Additionally or alternatively, the second liquid vapor separation may be conducted at a temperature of from about 100° C. to about 250° C., preferably from about 150° C. to about 250° C., preferably about 125° C. to about 225° C., preferably about 125° C. to about 200° C., or preferably about 150° C. to about 200° C. In particular, the second liquid vapor separation may be operated at pressure of about 0.5 torr (6 Pa) to about 200 torr (27 kPa) or 100 torr (13 kPa) to about 200 torr (27 kPa) and a temperature of about 150° C. to about 250° C. or about 150° C. to about 200° C.

1. Stripping Agents

As discussed above, a stripping agent may be combined with the effluent from the polymerization reactor and is preferably introduced into a first or second liquid vapor separation vessel and contacted with the effluent therein. Preferably, the polymerization effluent exits the polymerization reactor and is then transferred to a liquid vapor separator to obtain a second effluent. The second effluent is then preferably transferred to a second liquid vapor separator to obtain a third effluent, and the second effluent is contacted with stripping agent. Preferably, the stripping agent flows in a direction counter-current to a flow of the second effluent in the second vessel. For example, the stripping agent may be introduced toward a bottom portion of the second vessel flowing upward and contacting the second effluent as it flows downward through the second vessel.

Stripping agents useful in the processes and systems disclosed herein are non-polar and condensable. As used herein, the term "non-polar" refers to compounds in which there are no elements bonded to one another that give rise to a charge separation or if there is a charge separation between the elements due to differing electro-negativities, it is canceled out by an opposing charge separation. As used, herein the term "condensable" refers to substances or compounds which readily can be condensed from a vapor to a liquid under polymerization process conditions, e.g., by cooling. Advantageously, use of non-polar and condensable stripping agents may eliminate the need for further process steps like venting and/or further separation steps to avoid poisoning of the catalyst system. For example, non-condensable gases like nitrogen and carbon dioxide used as stripping agents typically require venting to avoid build-up. However, venting can risk releasing other desired, volatile species, such as unreacted monomer. Additionally, using volatile components, such as water and methanol, requires separation from condensate streams, which are to be recycled back into the system to avoid poisoning the catalyst system.

By way of non-limiting examples, useful non-polar and condensable stripping agents can include $C_2$-$C_{20}$ olefins (such as $C_2$-$C_{10}$ olefins, or $C_2$-$C_5$ olefins such as ethylene, propylene, butene, pentene or isomers thereof) and/or $C_2$-$C_{20}$ alkanes, such as ethane, propane, butane, hexane, pentane, heptane, octane, nonane, decane, undecane, dodecane or isomers thereof. In various aspects, the stripping agent may comprise ethylene and/or propylene or other monomers. The stripping agent flow rate can be adjusted as necessary for the separation conditions. Generally, the stripping agent should be ratioed to the feed rate, e.g. the flow rate of the stripping agent flow rate is 0.1 to 10% of the feed flow rate, preferably 0.5 to 5%, preferably 1 to 3%. Alternately, the stripping agent can be supplied at a flow rate of at least about 400 kg/h, at least about 500 kg/h, at least about 600 kg/h, at least about 700 kg/h, at least about 800 kg/h, at least about 900 kg/h, at least about 1000 kg/h, at least about 1200 kg/h, at least about 1500 kg/h, at least about 1800 kg/h, at least about 2000 kg/h, at least about 3000 kg/h, at least about 4000 kg/h, or at least about 5000 kg/h. For example, the stripping agent may be supplied at a flow rate from about 400 to about 5000 kg/h, from about 400 to 3000 kg/h, from about 400 to about 2000 kg/h or from about 400 to 1880 kg/h, as well as any other range of flow rates that a person of ordinary skill would consider acceptable in view of circumstances.

C. Recycle

In some embodiments, the process described herein, may further comprise recycling at least a portion of the second stream to the polymerization step. Advantageously, recycling of the second stream may not include purification of the second stream prior to addition to the polymerization step. Purification includes, but is not limited to, steps such as atmospheric venting, flaring, cooling (including but not limited to condensing), compressing and combinations thereof.

Optionally, at least a portion of polymer (e.g., polyolefin) may be recycled back to the polymerization step. Polymer (e.g., polyolefin) may be produced with a recycle ratio of at least about 2, at least about 5, at least about 10, at least about 15, at least about 20, at least about 25, at least about 30, at least about 35, at least about 40, at least about 45, at least about 50, at least about 55, or at least about 60. Preferably, polymer (e.g., polyolefin) may be produced with a recycle ratio of at least about 5, at least about 20 or at least about 50. Preferably, polymer (e.g., polyolefin) may be produced with a recycle ratio of about 2 to about 60, preferably about 5 to about 50, preferably about 6 to about 35, preferably about 8 to about 20.

D. Monomers

Hydrocarbon monomers useful herein include substituted or unsubstituted $C_2$ to $C_{40}$ olefins, preferably $C_2$ to $C_{20}$ olefins, preferably $C_2$ to $C_{12}$ olefins, preferably $C_2$ to $C_5$ olefins, preferably $C_2$ to $C_4$ olefins, preferably ethylene, propylene, butene, pentene, hexene, heptene, octene, nonene, decene, undecene, dodecene, and isomers thereof. Particularly preferred combinations include ethylene and butene; entylene and octene; propylene and ethylene, and propylene, ethylene and a diene.

The hydrocarbon monomers may also include $C_1$ to $C_{40}$ paraffins, preferably $C_1$ to $C_{20}$ paraffins, preferably $C_1$ to $C_{12}$ paraffins, preferably $C_1$ to $C_5$ paraffins, preferably $C_1$ to $C_4$ paraffins, preferably methane, ethane, propane, butane, pentane and isomers thereof. In particular, the hydrocarbon monomer can comprise $C_2$ to $C_{12}$ olefins and $C_1$ to $C_5$ paraffins.

In one embodiment, the hydrocarbon monomer comprises propylene and optional comonomers comprising one or more of ethylene and $C_4$ to $C_{40}$ olefins, preferably $C_4$ to $C_{20}$ olefins, or preferably $C_6$ to $C_{12}$ olefins. The $C_4$ to $C_{40}$ olefin monomers may be linear, branched, or cyclic. The $C_4$ to $C_{40}$ cyclic olefins may be strained or unstrained, monocyclic or polycyclic, and may optionally include heteroatoms and/or one or more functional groups.

In another embodiment, the hydrocarbon monomer comprises ethylene and optional comonomers comprising one or more $C_3$ to $C_{40}$ olefins, preferably $C_4$ to $C_{20}$ olefins, or preferably $C_6$ to $C_{12}$ olefins. The $C_3$ to $C_{40}$ olefin monomers may be linear, branched, or cyclic. The $C_3$ to $C_{40}$ cyclic olefins may be strained or unstrained, monocyclic or polycyclic, and may optionally include heteroatoms and/or one or more functional groups.

Exemplary $C_2$ to $C_{40}$ olefin monomers and optional comonomers include ethylene, propylene, butene, pentene, hexene, heptene, octene, nonene, decene, undecene, dodecene, norbornene, norbornadiene, dicyclopentadiene, cyclopentene, cycloheptene, cyclooctene, cyclooctadiene, cyclododecene, 7-oxanorbornene, 7-oxanorbornadiene, substituted derivatives thereof, and isomers thereof, preferably hexene, heptene, octene, nonene, decene, dodecene, cyclooctene, 1,5-cyclooctadiene, 1-hydroxy-4-cyclooctene, 1-acetoxy-4-cyclooctene, 5-methylcyclopentene, cyclopentene, dicyclopentadiene, norbornene, norbornadiene, and their respective homologs and derivatives, preferably norbornene, norbornadiene, and dicyclopentadiene.

In a preferred embodiment, one or more dienes are present in the polymer produced herein at up to 10 wt %, preferably at 0.00001 to 1.0 wt %, preferably 0.002 to 0.5 wt %, even more preferably 0.003 to 0.2 wt %, based upon the total weight of the composition. In some embodiments 500 ppm or less of diene is added to the polymerization, preferably 400 ppm or less, preferably or 300 ppm or less. In other embodiments at least 50 ppm of diene is added to the polymerization, or 100 ppm or more, or 150 ppm or more.

Useful diolefin monomers include any hydrocarbon structure, preferably $C_4$ to $C_{30}$, having at least two unsaturated bonds, wherein at least two of the unsaturated bonds are readily incorporated into a polymer by either a stereospecific or a non-stereospecific catalyst(s). It is further preferred that the diolefin monomers be selected from alpha, omega-diene monomers (i.e., di-vinyl monomers). More preferably, the diolefin monomers are linear di-vinyl monomers, most preferably those containing from 4 to 30 carbon atoms. Examples of preferred dienes include butadiene, pentadiene, hexadiene, heptadiene, octadiene, nonadiene, decadiene, undecadiene, dodecadiene, tridecadiene, tetradecadiene, pentadecadiene, hexadecadiene, heptadecadiene, octadecadiene, nonadecadiene, icosadiene, heneicosadiene, docosadiene, tricosadiene, tetracosadiene, pentacosadiene, hexacosadiene, heptacosadiene, octacosadiene, nonacosadiene, and triacontadiene. Particularly preferred dienes include 1,6-heptadiene, 1,7-octadiene, 1,8-nonadiene, 1,9-decadiene, 1,10-undecadiene, 1,11-dodecadiene, 1,12-tridecadiene, 1,13-tetradecadiene, and low molecular weight polybutadienes ($M_w$ less than 1000 g/mol). Preferred cyclic dienes include cyclopentadiene, vinylnorbornene, norbornadiene, ethylidene norbornene, divinylbenzene, dicyclopentadiene, or higher ring containing diolefins, with or without substituents at various ring positions.

E. Polymers

This disclosure also describes polymer compositions of matter produced by the methods described herein.

In a preferred embodiment, a process described herein produces homopolymers and copolymers of one, two, three, four or more $C_2$ to $C_{40}$ olefin monomers, preferably $C_2$ to $C_{20}$ alpha olefin monomers. Particularly useful monomers include ethylene, propylene, butene, pentene, hexene, heptene, octene, nonene, decene, undecene, dodecene, isomers thereof, and mixtures thereof.

Likewise, the processes of this disclosure produce olefin polymers, preferably polyethylene and polypropylene homopolymers and copolymers. In a preferred embodiment, the polymers produced are homopolymers of ethylene or homopolymers of propylene.

Alternately, the polymers produced herein are copolymers of a $C_2$ to $C_{40}$ olefin and one, two, or three or more different $C_2$ to $C_{40}$ olefins, (where the $C_2$ to $C_{40}$ olefins are preferably $C_3$ to $C_{20}$ olefins, preferably $C_3$ to $C_{12}$ alpha-olefin, preferably propylene, butene, hexene, octene, decene, dodecene, preferably propylene, butene, hexene, octane, or a mixture thereof).

Alternately, the polymers produced herein are copolymers of ethylene preferably having from 0 to 25 mole % (alternately from 0.5 to 20 mole %, alternately from 1 to 15 mole %, preferably from 3 to 10 mole %) of one or more $C_3$ to $C_{20}$ olefin comonomer (preferably $C_3$ to $C_{12}$ alpha-olefin, preferably propylene, butene, hexene, octene, decene, dodecene, preferably propylene, butene, hexene, octene).

Alternately, the polymers produced herein are copolymers of propylene preferably having from 0 to 30 mole % (alternately from 0.5 to 20 mole %, alternately from 1 to 15 mole %, preferably from 3 to 10 mole %) of one or more of $C_2$ or $C_4$ to $C_{20}$ olefin comonomers (preferably ethylene or $C_4$ to $C_{12}$ alpha-olefin, preferably ethylene, butene, hexene, octene, decene, dodecene, preferably ethylene, butene, hexene, octene).

Typically, the polymers produced herein have a $M_w$ of 5000 to 1,000,000 g/mol (preferably 25,000 to 750,000 g/mol, preferably 50,000 to 500,000 g/mol), and/or a $M_w/M_n$ of greater than 1 to 40 (alternately 1.2 to 20, alternately 1.3 to 10, alternately 1.4 to 5, alternately 1.5 to 4, alternately 1.5 to 3).

In a preferred embodiment, a polymer produced herein has a unimodal or multimodal molecular weight distribution as determined by Gel Permeation Chromatography (GPC). As used herein, "unimodal" means that the GPC trace has one peak or inflection point; "multimodal" means that the GPC trace has at least two peaks or inflection points. An inflection point is that point where the second derivative of the curve changes in sign (e.g., from negative to positive or vice versa).

Unless otherwise indicated $M_w$, $M_n$, and MWD (including the unimodal or multimodal character) are determined by GPC as described in US 2006/0173123 pages 24 & 25, paragraphs [0334] to [0341].

In a preferred embodiment the polymer (e.g., polyolefin) produced herein has a composition distribution breadth index (CDBI) of 50% or more, preferably 60% or more, preferably 70% or more. CDBI is a measure of the composition distribution of monomer within the polymer chains and is measured by the procedure described in PCT publication WO 93/03093, published Feb. 18, 1993, specifically columns 7 and 8 as well as in Wild et al. (1982) *J. Poly. Sci., Poly. Phys. Ed.* 20:441, and U.S. Pat. No. 5,008,204, including that fractions having a weight average molecular weight ($M_w$) below 15,000 g/mol are ignored when determining CDBI.

In various aspects, polymer (e.g., polyolefin) may be produced at a rate of ≥about 2 pounds per hour per gallon of reactor volume, ≥about 4 pounds per hour per gallon of reactor volume, ≥about 5 pounds per hour per gallon of reactor volume, ≥about 10 pounds per hour per gallon of reactor volume, ≥about 15 pounds per hour per gallon of reactor volume, ≥about 20 pounds per hour per gallon of reactor volume, ≥about 25 pounds per hour per gallon of reactor volume, ≥about 30 pounds per hour per gallon of reactor volume, ≥about 35 pounds per hour per gallon of reactor volume, ≥about 40 pounds per hour per gallon of reactor volume, ≥about 45 pounds per hour per gallon of reactor volume or ≥about 50 pounds per hour per gallon of reactor volume. Preferably, polymer (e.g., polyolefin) is produced at a rate of ≥about 5 pounds per hour per gallon of reactor volume, ≥about 10 pounds per hour per gallon of reactor volume, or ≥about 20 pounds per hour per gallon of reactor volume. Ranges expressly disclosed include combinations of any of the above-enumerated values, e.g., about 2 to about 50 pounds per hour per gallon of reactor volume, about 5 to about 40 pounds per hour per gallon of reactor volume, about 10 to about 30 pounds per hour per gallon of reactor volume, etc. Preferably, polymer (e.g., polyolefin) is produced at a rate of about 2 to about 40 pounds per hour per gallon of reactor volume, preferably about 5 to about 30 pounds per hour per gallon of reactor volume, preferably about 10 to about 25 pounds per hour per gallon of reactor volume.

The polymers may be stabilized and formed into pellets using conventional equipment and methods, such as by mixing the polymer and a stabilizer (such as antioxidant) together directly in a mixer (e.g., a single or twin-screw extruder) and then pelletizing the combination. Additionally, additives may be included in the pellets. Such additives are well known in the art, and can include, for example: fillers; antioxidants (e.g., hindered phenolics such as IRGANOX™ 1010 or IRGANOX™ 1076 available from Ciba-Geigy); phosphites (e.g., IRGAFOS™ 168 available from Ciba-Geigy); anti-cling additives; tackifiers, such as polybutenes, terpene resins, aliphatic and aromatic hydrocarbon resins, alkali metal and glycerol stearates, and hydrogenated rosins; UV stabilizers; heat stabilizers; anti-blocking agents; release agents; anti-static agents; pigments; colorants; dyes; waxes; silica; talc; and the like.

F. Polymer Blends

In another embodiment, the polymer (preferably the polyethylene or polypropylene) produced is combined with one or more additional polymers prior to being formed into a film, molded part or other article. Other useful polymers include polyethylene, isotactic polypropylene, highly isotactic polypropylene, syndiotactic polypropylene, random copolymer of propylene and ethylene, and/or butene, and/or hexene, polybutene, ethylene vinyl acetate, LDPE, LLDPE, HDPE, ethylene vinyl acetate, ethylene methyl acrylate, copolymers of acrylic acid, polymethylmethacrylate or any other polymers polymerizable by a high-pressure free radical process, polyvinylchloride, polybutene-1, isotactic polybutene, ABS resins, ethylene-propylene rubber (EPR), vulcanized EPR, EPDM, block copolymer, styrenic block copolymers, polyamides, polycarbonates, PET resins, cross linked polyethylene, copolymers of ethylene and vinyl alcohol (EVOH), polymers of aromatic monomers such as polystyrene, poly-1 esters, polyacetal, polyvinylidine fluoride, polyethylene glycols, and/or polyisobutylene.

In a preferred embodiment, the polymer (preferably the polyethylene or polypropylene) produced herein is present in the above blends, from 10 to 99 wt %, based upon the weight of the polymers in the blend, preferably 20 to 95 wt %, even more preferably at least 30 to 90 wt %, even more preferably at least 40 to 90 wt %, even more preferably at least 50 to 90 wt %, even more preferably at least 60 to 90 wt %, even more preferably at least 70 to 90 wt %.

The blends described above may be produced by mixing the polymers with one or more polymers (as described above), by connecting reactors together in series to make reactor blends or by using more than one catalyst in the same reactor to produce multiple species of polymer. The polymers can be mixed together prior to being put into the extruder or may be mixed in an extruder.

The blends may be formed using conventional equipment and methods, such as by dry blending the individual components and subsequently melt mixing in a mixer, or by mixing the components together directly in a mixer, such as, for example, a Banbury mixer, a Haake mixer, a Brabender internal mixer, or a single or twin-screw extruder, which may include a compounding extruder and a side-arm extruder used directly downstream of a polymerization process, which may include blending powders or pellets of the resins at the hopper of the film extruder. Additionally, additives may be included in the blend, in one or more components of the blend, and/or in a product formed from the blend, such as a film, as desired. Such additives are well known in the art, and can include, for example: fillers; antioxidants (e.g., hindered phenolics such as IRGANOX™ 1010 or IRGANOX™ 1076 available from Ciba-Geigy); phosphites (e.g., IRGAFOS™ 168 available from Ciba-Geigy); anti-cling additives; tackifiers, such as polybutenes, terpene resins, aliphatic and aromatic hydrocarbon resins, alkali metal and glycerol stearates, and hydrogenated rosins; UV stabilizers; heat stabilizers; anti-blocking agents; release agents; anti-static agents; pigments; colorants; dyes; waxes; silica; talc; and the like.

G. Films

Specifically, any of the foregoing polymers, such as the foregoing polypropylenes or blends thereof, may be used in a variety of end-use applications. Such applications include, for example, mono- or multi-layer blown, extruded, and/or shrink films. These films may be formed by any number of well known extrusion or coextrusion techniques, such as a blown bubble film processing technique, wherein the composition can be extruded in a molten state through an annular die and then expanded to form a uni-axial or biaxial orientation melt prior to being cooled to form a tubular, blown film, which can then be axially slit and unfolded to form a flat film. Films may be subsequently unoriented, uniaxially oriented, or biaxially oriented to the same or different extents. One or more of the layers of the film may be oriented in the transverse and/or longitudinal directions to the same or different extents. The uniaxially orientation can be accomplished using typical cold drawing or hot drawing methods. Biaxial orientation can be accomplished using tenter frame equipment or double bubble processes and may occur before or after the individual layers are brought together. For example, a polyethylene layer can be extrusion coated or laminated onto an oriented polypropylene layer or the polyethylene and polypropylene can be coextruded together into a film, then oriented. Likewise, oriented polypropylene can be laminated to oriented polyethylene, or oriented polyethylene can be coated onto polypropylene, then optionally the combination could be oriented even further. Typically the films are oriented in the Machine Direction (MD) at a ratio of up to 15, preferably between 5 and 7, and in the Transverse Direction (TD) at a ratio of up to 15, preferably 7 to 9. However, in another embodiment, the film is oriented to the same extent in both the MD and TD directions.

The films may vary in thickness depending on the intended application; however, films of a thickness from 1 to 50 μm are usually suitable. Films intended for packaging are usually from 10 to 50 μm thick. The thickness of the sealing layer is typically 0.2 to 50 μm. There may be a sealing layer on both the inner and outer surfaces of the film or the sealing layer may be present on only the inner or the outer surface.

In another embodiment, one or more layers may be modified by corona treatment, electron beam irradiation, gamma irradiation, flame treatment, or microwave. In a preferred embodiment, one or both of the surface layers is modified by corona treatment.

H. Catalyst System

The catalyst system used in the polymerization process described herein comprises at least one catalyst compound (e.g., olefin polymerization catalyst compound, such as metallocene compound, Ziegler-Natta catalyst, post-metallocene compound, etc.), an activator, optional scavenger, and optional support. The catalyst compound and activator may be combined in any order. For example, the catalyst and the activator may be combined prior to contacting the monomer. Alternatively, the activator may be added to a solution of the monomer and the catalyst compound. Preferably, the activator and catalyst are contacted to form the catalyst system prior to entering a reaction zone. Preferably, the activator and catalyst are contacted to form the catalyst system immediately prior to entering a reaction zone. As used herein, "immediately" refers to a period of time of about 1 to about 120 seconds, preferably about 1 to about 60 seconds, preferably about 1 to 30 seconds before the activator and the catalyst enter a reaction zone. Additionally or alternatively, the activator may be introduced to a recycle stream comprising monomer, catalyst system and, optionally polymer.

For the purposes of this disclosure and the claims thereto, when catalyst systems are described as comprising neutral stable forms of the components, it is well understood by one of ordinary skill in the art, that the ionic form of the component is the form that reacts with the monomers to produce polymers. When "catalyst system" is used to describe such a catalyst/activator before activation, it means the unactivated catalyst complex (precatalyst) together with an activator, support and, optionally, a co-activator. When it is used to describe such after activation, it means the support, the activated complex, and the activator or other charge-balancing moiety. The transition metal compound may be neutral as in a precatalyst, or a charged species with a counter ion as in an activated catalyst system.

In the description herein, the catalyst may be described as a catalyst precursor, a pre-catalyst compound, catalyst compound or a transition metal compound, and these terms are used interchangeably. For purposes of this disclosure and claims thereto in relation to catalyst compounds, the term "substituted" means that a hydrogen group has been replaced with a hydrocarbyl group, a heteroatom, a heteroatom-containing group or where at least one heteroatom has been inserted within a hydrocarbyl ring. For example, methyl cyclopentadiene (Cp) is a Cp group substituted with a methyl group. Indene and fluorene (and substituted variants thereof) are substituted cyclopentadiene groups. The term cyclopentadienyl ligand is used herein to mean an unsaturated cyclic hydrocarbyl ligand that can consist of one ring, or two or more fused or catenated rings, one of which is an aromatic $C_5$ ring. Substituted or unsubstituted cyclopentadienyl ligands, indenyl ligands, and fluorenyl ligands are all examples of cyclopentadienyl ligands.

Any pre-catalyst compound (catalyst precursor compound) that can produce the desired polymer species may be used in the processes and systems disclosed herein. Suitable pre-catalyst/catalyst precursor compounds include—by way of non-limiting examples—metallocene transition metal compounds (containing one, or two cyclopentadienyl ligands per metal atom), non-metallocene early transition metal compounds (including those with amide and/or phenoxide type ligands), non-metallocene late transition metal compounds (including those with diimine or diiminepyridyl ligands), non-metallocene catalyst compounds described in WO 03/040095, WO 03/040201, WO 03/040233, and WO 03/040442, and other transition metal compounds.

Suitable catalysts for use in the processes and systems described herein include any suitable coordination catalyst, such as a metallocene compound, constrained geometry catalyst compound, post-metallocene compound, Ziegler-Natta catalyst and combinations thereof.

2. Metallocene Compounds

Generally, bulky ligand metallocene compounds (pre-catalysts) useful in the processes and systems of this disclosure include half- and full-sandwich compounds having one or more bulky, often cyclic ligands bonded to at least one metal atom. Typical bulky ligand metallocene compounds are generally described as containing one or more bulky ligand(s) and one or more leaving group(s) bonded to at least one metal atom. The bulky ligands are generally represented by one or more open, acyclic, or fused ring(s) or ring system(s) or a combination thereof. These bulky ligands, preferably the ring(s) or ring system(s) are typically composed of atoms selected from Groups 13 to 16 of the Periodic Table of Elements, preferably the atoms are selected from the group consisting of carbon, nitrogen, oxygen, silicon, sulfur, phosphorous, germanium, boron, and aluminum, or a combination thereof. In certain embodiments, the ring(s) or ring system(s) are composed of carbon atoms, such as, but not limited to, cyclopentadienyl ligands or cyclopentadienyl-type ligand structures or other similar functioning ligand structure such as a pentadienyl, a cyclooctatetraendiyl, a cyclobutadienyl, or a substituted allyl ligand. Other ligands that can function similarly to a cyclopentadienyl-type ligand include: amides, phosphides, imines, phosphinimines, amidinates, and ortho-substituted phenoxides. The metal atom is preferably selected from Groups 3 through 15 and the lanthanide or actinide series of the Periodic Table of Elements. In certain embodiments, the metal is a transition metal from Groups 3 through 12, for example, Groups 4, 5, and 6. In certain embodiments, the transition metal is a Group 4 metal.

In embodiments, the catalyst composition useful herein includes one or more bulky ligand metallocene catalyst compounds represented by the formula:

$$L^A L^B M Q^*_n \quad (1)$$

where M is a metal atom from the Periodic Table of the Elements and may be a Group 3 to 12 metal or from the lanthanide or actinide series of the Periodic Table of Elements, preferably M is a Group 4, 5, or 6 transition metal, more preferably M is a Group 4 transition metal, even more preferably, M is zirconium, hafnium, or titanium; $Q^*$ is a monoanionic ligand; and n is 0, 1, or 2. The bulky ligands, $L^A$ and $L^B$, are open, acyclic or fused ring(s) or ring system(s) and are any ancillary ligand system, including unsubstituted or substituted, cyclopentadienyl ligands or cyclopentadienyl-type ligands, heteroatom substituted and/or heteroatom-containing cyclopentadienyl-type ligands. Non-limiting examples of bulky ligands include cyclopentadienyl ligands, cyclopentaphenanthreneyl ligands, indenyl ligands, benzindenyl ligands, fluorenyl ligands, dibenzo[b,h]fluorenyl ligands, benzo[b]fluorenyl ligands, cyclooctatetraendiyl ligands, cyclopentacyclododecene ligands, azenyl ligands, azulene ligands, pentalene ligands, phosphoyl ligands, phosphinimine (see WO 99/40125), pyrrolyl ligands, pyrozolyl ligands, carbazolyl ligands, boratobenzene ligands, and the like, including hydrogenated versions thereof, for example, tetrahydroindenyl ligands. In one embodiment, $L^A$ and $L^B$ may be any other ligand structure capable of π-bonding to M. In yet another embodiment, the atomic molecular weight (MW) of $L^A$ or $L^B$ exceeds 60 a.m.u., preferably greater than 65 a.m.u. In another embodiment, $L^A$ and $L^B$ may comprise one or more heteroatoms, for example, nitrogen, silicon, boron, germanium, sulfur and phosphorous, in combination with carbon atoms to form an open, acyclic, or preferably a fused, ring or ring system, for example, a hetero-cyclopentadienyl ancillary ligand. Other $L^A$ and $L^B$ bulky ligands include, but are not limited to, bulky amides, phosphides, alkoxides, aryloxides, imides, carbolides, borollides, porphyrins, phthalocyanines, corrins, and other polyazomacrocycles. Independently, each $L^A$ and $L^B$ may be the same or different type of bulky ligand that is bonded to M. In an embodiment of Formula 1 only one of either $L^A$ or $L^B$ is present.

Independently, each $L^A$ and $L^B$ may be unsubstituted or substituted with a combination of substituent groups $R^*$. Non-limiting examples of substituent groups $R^*$ include one or more from the group selected from hydrogen, or linear or branched alkyl radicals, alkenyl radicals, alkynyl radicals, cycloalkyl radicals, aryl radicals, acyl radicals, aroyl radicals, alkoxy radicals, aryloxy radicals, alkylthio radicals, dialkylamino radicals, alkoxycarbonyl radicals, aryloxycarbonyl radicals, carbomoyl radicals, alkyl- or dialkyl-carbamoyl radicals, acyloxy radicals, acylamino radicals, arylamino radicals, or combinations thereof. In a preferred embodiment, substituent groups $R^*$ have up to 50 non-hydrogen atoms, preferably from 1 to 30 carbons, that can also be substituted with halogens or heteroatoms or the like. Non-limiting examples of alkyl substituents $R^*$ include methyl, ethyl, propyl, butyl, pentyl, hexyl, cyclopentyl, cyclohexyl, benzyl, or phenyl groups and the like, including all their isomers, for example, tertiary butyl, isopropyl, and the like. Other hydrocarbyl radicals include fluoromethyl, fluoroethyl, difluoroethyl, iodopropyl, bromohexyl, chlorobenzyl, and hydrocarbyl substituted organometalloid radicals including trimethylsilyl, trimethylgermyl, methyldiethylsilyl, and the like; and halocarbyl-substituted organometalloid radicals including tris(trifluoromethyl)silyl, methyl-bis(difluoromethyl)silyl, bromomethyldimethylgermyl and the like; and disubstituted boron radicals including dimethylboron, for example; and disubstituted pnictogen radicals including dimethylamine, dimethylphosphine, diphenylamine, methylphenylphosphine, chalcogen radicals including methoxy, ethoxy, propoxy, phenoxy, methylsulfide, and ethylsulfide. Non-hydrogen substituents $R^*$ include the atoms carbon, silicon, boron, aluminum, nitrogen, phosphorous, oxygen, tin, sulfur, germanium and the like, including olefins such as, but not limited to, olefinically unsaturated substituents including vinyl-terminated ligands, for example, but-3-enyl, prop-2-enyl, hex-5-enyl, and the like. Also, at least two $R^*$ groups, preferably two adjacent R groups, are joined to form a ring structure having from 3 to 30 atoms selected from carbon, nitrogen, oxygen, phosphorous, silicon, germanium, aluminum, boron, or a combination thereof. Also, a substituent group, $R^*$, may also be a di-radical bonded to L at one end and forming a carbon sigma bond to the metal M. Other ligands may be bonded to the metal M, such as at least one leaving group $Q^*$. In one embodiment, $Q^*$ is a monoanionic labile ligand having a sigma-bond to M. Depending on the oxidation state of the metal, the value for n is 0, 1, or 2, such that Formula 1 above represents a neutral bulky ligand metallocene catalyst compound. Non-limiting examples of $Q^*$ ligands include weak bases such as amines, phosphines, ethers, carboxylates, dienes, hydrocarbyl radicals, having from 1 to 20 carbon atoms, hydrides or halogens and the like, or a combination thereof. In another embodiment, two or more $Q^*$s form a part of a fused ring or ring system. Other examples of $Q^*$ ligands include those substituents for $R^*$ as described above and including cyclobutyl, cyclohexyl, heptyl, tolyl, trifluoromethyl, tetramethylene (both $Q^*$), pentamethylene (both $Q^*$), methylidene (both $Q^*$), methoxy, ethoxy, propoxy, phenoxy, bis(N-methylanilide), dimethylamide, dimethylphosphide radicals and the like.

In another embodiment, the catalyst composition useful herein may include one or more bulky ligand metallocene catalyst compounds where $L^A$ and $L^B$ of Formula 1 are bridged to each other by at least one bridging group, $A^*$, as represented by Formula 2.

$$L^A A^* L^B M Q^*_n \quad (2)$$

The compounds of Formula 2 are known as bridged, bulky ligand metallocene catalyst compounds. $L^A$, $L^B$, M, $Q^*$ and n are as defined above and $A^*$ is a bridging group. Non-limiting examples of bridging group $A^*$ include bridging groups containing at least one Group 13 to 16 atom, often referred to as a divalent moiety such as, but not limited to, at least one of a carbon, oxygen, nitrogen, silicon, aluminum, boron, germanium, and tin atom or a combination thereof. Preferably bridging group $A^*$ contains a carbon, silicon, or germanium atom, most preferably $A^*$ contains at least one silicon atom or at least one carbon atom. The bridging group $A^*$ may also contain substituent groups $R^*$ as defined above including halogens and iron. Non-limiting examples of bridging group $A^*$ may be represented by $R'_2C$, $R'_2CCR'_2$, $R'_2Si$, $R'_2SiCR'_2$, $R'_2SiSiR'_2$, $R'_2Ge$, R'P, R'N, R'B where R' is independently, a radical group which is hydride, hydrocarbyl, substituted hydrocarbyl, halocarbyl, substituted halocarbyl, hydrocarbyl-substituted organometalloid, halocarbyl-substituted organometalloid, disubstituted boron, disubstituted pnictogen, substituted chalcogen, or halogen or two or more R' may be joined to form a ring or ring system. In one embodiment, the bridged, bulky ligand metallocene catalyst compounds of Formula 2 have two or more bridging groups A* (see EP 664 301 B1). In another embodiment, the bulky ligand metallocene catalyst compounds are those where the R* substituents on the bulky ligands $L^A$ and $L^B$ of Formulas 1 and 2 are substituted with the same or different number of substituents on each of the bulky ligands. In another embodiment, the bulky ligands $L^A$ and $L^B$ of Formulas 1 and 2 are different from each other.

Other useful bulky ligand metallocene catalyst compounds and catalyst systems include those described in U.S. Pat. Nos. 5,064,802; 5,145,819; 5,149,819; 5,243,001; 5,239,022; 5,276,208; 5,296,434; 5,321,106; 5,329,031; 5,304,614; 5,677,401; 5,723,398; 5,753,578; 5,854,363; 5,856,547; 5,858,903; 5,859,158; 5,900,517; and 5,939,503; and PCT publications WO 93/08221; WO 93/08199; WO 95/07140; WO 98/11144; WO 98/41530; WO 98/41529; WO 98/46650; WO 99/02540; and WO 99/14221; and European publications EP-A-0 578 838; EP-A-0 638 595; EP-B-0 513 380; EP-A1-0 816 372; EP-A2-0 839 834; EP-B1-0 632 819; EP-B1-0 748 821; and EP-B1-0 757 996; all of which are herein fully incorporated by reference.

In another embodiment, the catalyst compositions may include bridged heteroatom, mono-bulky ligand metallocene compounds. These types of catalysts and catalyst systems are described in, for example, PCT publications WO 92/00333; WO 94/07928; WO 91/04257; WO 94/03506; WO 96/00244; WO 97/15602; and WO 99/20637; and U.S. Pat. Nos. 5,057,475; 5,096,867; 5,055,438; 5,198,401; 5,227,440; and 5,264,405; and European publication EP-A-0 420 436, all of which are herein fully incorporated by reference.

In another embodiment, the catalyst composition includes one or more bulky ligand metallocene catalyst compounds represented by Formula 3:

$$L^C A^* J^* M'Q^*_n \qquad (3)$$

where M' is a Group 3 to 16 metal atom or a metal selected from the Group of actinides and lanthanides of the Periodic Table of Elements, preferably M' is a Group 3 to 12 transition metal, and more preferably M' is a Group 4, 5, or 6 transition metal, and most preferably M' is a Group 4 transition metal in any oxidation state, and is especially titanium; $L^C$ is a substituted or unsubstituted bulky ligand bonded to M; J* is bonded to M; A* is bonded to J* and $L^C$; J* is a heteroatom ancillary ligand; and A* is a bridging group; Q* is a univalent anionic ligand; and n is the integer 0, 1, or 2. In Formula 3 above, $L^C$, A* and J* form a fused ring system. In an embodiment, $L^C$ of Formula 3 is as defined above for $L^A$. A*, M and Q* of Formula 3 are as defined above in Formula 1 and 2. In Formula 3, J* is a heteroatom-containing ligand in which J* is an element with a coordination number of three from Group 15 or an element with a coordination number of two from Group 16 of the Periodic Table of Elements. Preferably J* contains a nitrogen, phosphorus, oxygen, or sulfur atom with nitrogen being most preferred. Preferably J* is as defined for $JR^*_z$ below. The bulky ligand metallocene catalyst compounds can optionally be heterocyclic ligand complexes where the bulky ligands, the ring(s), or ring system(s), include one or more heteroatoms or a combination thereof. Non-limiting examples of heteroatoms include a Group 13 to 16 element, preferably nitrogen, boron, sulfur, oxygen, aluminum, silicon, phosphorous, and tin. Examples of these bulky ligand metallocene catalyst compounds are described in WO 96/33202; WO 96/34021; WO 97/17379; WO 98/22486; EP-A1-0 874 005; and U.S. Pat. Nos. 5,637,660; 5,539,124; 5,554,775; 5,756,611; 5,233,049; 5,744,417; and 5,856,258; all of which are herein incorporated by reference.

In one embodiment, the bulky ligand metallocene compounds (pre-catalysts) are those complexes based on bidentate ligands containing pyridine or quinoline moieties, such as those described in U.S. Pat. No. 6,103,657, which is herein incorporated by reference. In another embodiment, the bulky ligand metallocene catalyst compounds are those described in PCT publications WO 99/01481 and WO 98/42664, which are fully incorporated herein by reference.

In another embodiment, the bulky ligand metallocene catalyst compound is a complex of a metal, preferably a transition metal, a bulky ligand, preferably a substituted or unsubstituted π-bonded ligand, and one or more heteroallyl moieties, such as those described in U.S. Pat. Nos. 5,527,752; 5,747,406; and EP-B1-0 735 057, all of which are herein fully incorporated by reference.

Useful metallocene compounds include compounds represented by the formula (XX): $T_y Cp_m MG_n X_q$ wherein Cp is a cyclopentadienyl group (such as cyclopentadiene, indene or fluorene) which may be substituted or unsubstituted, such as $L^A$ defined above; M is a Group 4, 5 or 6 transition metal, for example titanium, zirconium, hafnium, vanadium, niobium, tantalum, chromium, molybdenum and tungsten; G is a heteroatom group represented by the formula $JR^*_z$ where J is a group 15 or 16 element, preferably N, P, O or S, and R* is a $C_1$ to $C_{20}$ hydrocarbyl group and z is 1 or 2; T is a bridging group and y is 0 or 1; each X is, independently, a leaving group, or two X are joined and bound to the metal atom to form a metallocycle ring, or two X are joined to form a chelating ligand, a diene ligand, or an alkylidene ligand; and m=1 or 2, n=0, 1, 2, or 3, q=0, 1, 2, or 3, and the sum of m+n+q is equal to the oxidation state of the transition metal (preferably 2, 3, 4, 5, or 6, preferably 4 or 5, preferably 4).

In a preferred embodiment, M is a Group 4 transition metal (preferably Hf, Ti and/or Zr).

In a preferred embodiment, each Cp is a cyclopentadiene, indene, or fluorene, which may be substituted or unsubstituted; each M is titanium, zirconium, or hafnium; and each X is, independently, a halide, a hydride, an alkyl group, an alkenyl group or an arylalkyl group.

In a preferred embodiment, y is one, m is one, n is one, J is N, and R* is methyl, ethyl, propyl, butyl, pentyl, hexyl, heptyl, octyl, nonyl, cyclooctyl, cyclododecyl, decyl, undecyl, dodecyl, adamantyl, or an isomer thereof.

Typically, each G is, independently, a heteroatom group represented by the formula $JR^*_z$ where J is a group 15 or 16 element, preferably N, P, O, or S (preferably N or O, preferably N), and R* is a $C_1$ to $C_{20}$ hydrocarbyl group. Typically, a linear branched or cyclic hydrocarbyl group having from one to twenty carbon atoms (such as methyl, ethyl, propyl, butyl, pentyl, hexyl, heptyl, octyl, nonyl, decyl, undecyl, dodecyl, or an isomer thereof, including t-butyl, cyclododecyl, cyclooctyl, and the like) and z is 1 or 2.

In an embodiment, when m is 1, n is preferably 1 and G is a heteroatom group represented by the formula $JR^*_z$ where J is a group 15 or 16 element, preferably N, P, O or S (preferably N or O, preferably N), and R* is a linear branched or cyclic hydrocarbyl group having from one to twenty carbon atoms (such as methyl, ethyl, propyl, butyl, pentyl, hexyl, heptyl, octyl, nonyl, decyl, undecyl, dodecyl or an isomer thereof, including t-butyl, cyclodecyl, cyclooctyl, and the like) and z is 1 or 2, preferably JR*z is cyclododecyl amido, t-butyl amido, and or 1-adamantyl amido.

In an embodiment, when m is 2 or 3, n is 0.

In an embodiment each X may be, independently, a halide, a hydride, an alkyl group, an alkenyl group, or an arylalkyl group.

Alternately, each X is, independently, selected from the group consisting of hydrocarbyl radicals having from 1 to 20 carbon atoms, aryls, hydrides, amides, alkoxides, sulfides, phosphides, halides, dienes, amines, phosphines, ethers, and a combination thereof, (two Xs may form a part of a fused ring or a ring system), preferably each X is independently selected from halides, aryls, and $C_1$ to $C_5$ alkyl groups, preferably each X is a phenyl, methyl, ethyl, propyl, butyl, pentyl, or chloro group.

Typically, each Cp group is, independently, a substituted or unsubstituted cyclopentadiene, a substituted or unsubstituted indene, or a substituted or unsubstituted fluorene.

Independently, each Cp group may be substituted with a combination of substituent groups R. Non-limiting examples of substituent groups R include one or more from the group selected from hydrogen, or linear, branched alkyl radicals, or alkenyl radicals, alkynyl radicals, cycloalkyl radicals or aryl radicals, acyl radicals, alkoxy radicals, aryloxy radicals, alkylthio radicals, dialkylamino radicals, alkoxycarbonyl radicals, aryloxycarbonyl radicals, carbamoyl radicals, alkyl- or dialkyl-carbamoyl radicals, acyloxy radicals, acylamino radicals, aroylamino radicals, straight, branched or cyclic, alkylene radicals, or combination thereof. In a preferred embodiment, substituent groups R have up to 50 non-hydrogen atoms, preferably from 1 to 30 carbon, that can also be substituted with halogens or heteroatoms or the like. Non-limiting examples of alkyl substituents R include methyl, ethyl, propyl, butyl, pentyl, hexyl, cyclopentyl, cyclohexyl, benzyl or phenyl groups, and the like, including all their isomers, for example, tertiary butyl, isopropyl, and the like. Other hydrocarbyl radicals include fluoromethyl, fluoroethyl, difluoroethyl, iodopropyl, bromohexyl chlorobenzyl and hydrocarbyl substituted organometalloid radicals including trimethylsilyl, trimethylgermyl, methyldiethylsilyl, and the like; and halocarbyl-substituted organometalloid radicals including tris(trifluoromethyl)-silyl, methylbis(difluoromethyl)silyl, bromomethyldimethylgermyl, and the like; and disubstituted boron radicals including dimethylboron for example; and disubstituted pnictogen radicals including dimethylamine, dimethylphosphine, diphenylamine, methylphenylphosphine, chalcogen radicals including methoxy, ethoxy, propoxy, phenoxy, methylsulfide and ethylsulfide. Non-hydrogen substituents R include the atoms carbon, silicon, boron, aluminum, nitrogen, phosphorus, oxygen, tin, sulfur, germanium, and the like, including olefins such as, but not limited to, olefinically unsaturated substituents including vinyl-terminated ligands, for example but-3-enyl, prop-2-enyl, hex-5-enyl, and the like. Also, at least two R groups, preferably two adjacent R groups, may be joined to form a ring structure having from 3 to 30 atoms selected from carbon, nitrogen, oxygen, phosphorus, silicon, germanium, aluminum, boron, or a combination thereof.

In an embodiment of the Cp group, the substituent(s) R are, independently, hydrocarbyl groups, heteroatoms, or heteroatom containing groups, such as methyl, ethyl, propyl, butyl, pentyl, hexyl, heptyl, octyl, nonyl, decyl, undecyl, dodecyl or an isomer thereof, N, O, S, P, or a $C_1$ to $C_{20}$ hydrocarbyl substituted with an N, O, S and or P heteroatom or heteroatom containing group (typically having up to 12 atoms, including the N, O, S and P heteroatoms).

Non-limiting examples of Cp groups include cyclopentadienyl ligands, cyclopentaphenanthreneyl ligands, indenyl ligands, benzindenyl ligands, fluorenyl ligands, octahydrofluorenyl ligands, cyclooctatetraenyl ligands, cyclopentacyclododecene ligands, azenyl ligands, azulene ligands, pentalene ligands, phosphoyl ligands, phosphinimine ligands (WO 99/40125), pyrrolyl ligands, pyrazolyl ligands, carbazolyl ligands, borabenzene ligands and the like, including hydrogenated versions thereof, for example tetrahydroindenyl ligands. In another embodiment, each Cp may, independently, comprise one or more heteroatoms, for example, nitrogen, silicon, boron, germanium, sulfur, and phosphorus, in combination with carbon atoms to form an open, acyclic, or preferably a fused, ring or ring system, for example, a heterocyclopentadienyl ancillary ligand. Other Cp ligands include but are not limited to porphyrins, phthalocyanines, corrins, and other polyazamacrocycles.

Preferably, T is present and is a bridging group containing at least one Group 13, 14, 15, or 16 element, in particular boron or a Group 14, 15, or 16 element. Examples of suitable bridging groups include P(=S)R', P(=Se)R', P(=O)R', R'$_2$C, R'$_2$Si, R'$_2$Ge, R'$_2$CCR'$_2$, R'$_2$CCR'$_2$CR'$_2$, R'$_2$CCR'$_2$CR'$_2$CR'$_2$, R'C=CR', R'C=CR'CR'$_2$, R'$_2$CCR'=CR'CR'$_2$, R'C=CR'CR'=CR', R'C=CR'CR'$_2$CR'$_2$, R'$_2$CSiR'$_2$, R'$_2$SiSiR'$_2$, R'$_2$SiOSiR'$_2$, R'$_2$CSiR'$_2$CR'$_2$, R'$_2$SiCR'$_2$SiR'$_2$, R'C=CR'SiR'$_2$, R'$_2$CGeR'$_2$, R'$_2$GeGeR'$_2$, R'$_2$CGeR'$_2$CR'$_2$, R'$_2$GeCR'$_2$GeR'$_2$, R'$_2$SiGeR'$_2$, R'C=CR'GeR'$_2$, R'B, R'$_2$C—BR', R'$_2$C—BR'—CR'$_2$, R'$_2$C—O—CR'$_2$, R'$_2$CR'$_2$C—O—CR'$_2$CR'$_2$, R'$_2$C—O—CR'$_2$CR'$_2$, R'$_2$C—O—CR'=CR', R'$_2$C—S—CR'$_2$, R'$_2$CR'$_2$C—S—CR'$_2$CR'$_2$, R'$_2$C—S—CR'$_2$CR'$_2$, R'$_2$C—S—CR'=CR', R'$_2$C—Se—CR'$_2$, R'$_2$CR'$_2$C—Se—CR'$_2$CR'$_2$, R'$_2$C—Se—CR'$_2$CR'$_2$, R'$_2$C—Se—CR'=CR', R'$_2$C—N=CR', R'$_2$C—NR'—CR'$_2$, R'$_2$C—NR'—CR'$_2$CR'$_2$, R'$_2$C—NR'—CR'=CR', R'$_2$CR'$_2$C—NR'—CR'$_2$CR'$_2$, R'$_2$C—P=CR', R'$_2$C—PR'—CR'$_2$, O, S, Se, Te, NR', PR', AsR', SbR', O—O, S—S, R'N—NR', R'P—PR', O—S, O—NR', O—PR', S—NR', S—PR', and R'N—PR' where R' is hydrogen or a $C_1$-$C_{20}$ containing hydrocarbyl, substituted hydrocarbyl, halocarbyl, substituted halocarbyl, silylcarbyl or germylcarbyl substituent. Optionally two or more adjacent R' may join to form a substituted or unsubstituted, saturated, partially unsaturated or aromatic, cyclic or polycyclic substituent. Preferred examples for the bridging group T include CH$_2$, CH$_2$CH$_2$, SiMe$_2$, SiPh$_2$, SiMePh, Si(CH$_2$)$_3$, Si(CH$_2$)$_4$, O, S, NPh, PPh, NMe, PMe, NEt, NPr, NBu, PEt, PPr, Me$_2$SiOSiMe$_2$, and PBu.

In a preferred embodiment, T is represented by the formula R$^a$$_2$J or (R$^a$$_2$J)$_2$, where J is C, Si, or Ge, and each R$^a$ is, independently, hydrogen, halogen, $C_1$ to $C_{20}$ hydrocarbyl (such as methyl, ethyl, propyl, butyl, pentyl, hexyl, heptyl, octyl, nonyl, decyl, undecyl, or dodecyl) or a $C_1$ to $C_{20}$ substituted hydrocarbyl. Two R$^a$ can form a cyclic structure including aromatic, partially saturated, or saturated cyclic or fused ring system. Preferably, T is a bridging group comprising carbon or silica, such as dialkylsilyl, preferably T is selected from CH$_2$, CH$_2$CH$_2$, C(CH$_3$)$_2$, SiMe$_2$, SiPh$_2$, SiMePh, silylcyclobutyl (Si(CH$_2$)$_3$), (Ph)$_2$C, (p-(Et)$_3$SiPh)$_2$C, Me$_2$SiOSiMe$_2$, and cyclopentasilylene (Si(CH$_2$)$_4$).

Useful bridged metallocene compounds having one cyclopentadienyl ring include those represented by the formula (XXI):

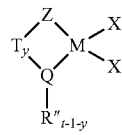

wherein M is the same as M described above, preferably M is titanium, zirconium or hafnium, preferably titanium; Z is a substituted or unsubstituted Cp group (useful Z groups are represented by the formula: $(C_5H_{4-d}S^*_d)$, where d is 1, 2, 3 or 4, S* is hydrocarbyl groups, heteroatoms, or heteroatom containing groups, such as methyl, ethyl, propyl, butyl, pentyl, hexyl, heptyl, octyl, nonyl, decyl, undecyl, dodecyl, or an isomer thereof, N, O, S, P, or a $C_1$ to $C_{20}$ hydrocarbyl substituted with an N, O, S, and/or P heteroatom or heteroatom containing group (typically having up to 12 atoms, including the N, O, S, and P heteroatoms). Two S* may form a cyclic or multicyclic group. Preferably Z is tetramethylcyclopentadienyl.

T is a bridging group as described above that is bonded to Z and Q, y is one.

Q is a heteroatom with a coordination number of three from Group 15 or with a coordination number of two from Group 16 of the Periodic Table of Elements, such as N, O, S, or P. Preferably Q is nitrogen.

R" is selected from a $C_3$-$C_{100}$ substituted or unsubstituted monocyclic or polycyclic ring structure substituent that is partially unsaturated, unsaturated or aromatic; or a $C_2$-$C_{100}$ substituted or unsubstituted, unsaturated or partially unsaturated, linear or branched alicyclic hydrocarbyl substituent; or a $C_1$-$C_{100}$ substituted or unsubstituted saturated hydrocarbyl radical (preferably R" is selected from methyl, ethyl, all propyl isomers, all butyl isomers, phenyl, benzyl, phenethyl, 1-adamantyl, cyclododecyl, cyclohexyl, and norbornyl);

t is the coordination number of the heteroatom Q where "t-1-y" indicates the number of R" substituents bonded to Q; and each X is, independently, a univalent anionic ligand, or two X are joined and bound to the metal atom to form a metallocycle ring, or two X are joined to form a chelating ligand, a diene ligand, or an alkylidene ligand.

Illustrative, but not limiting, examples of preferred monocyclopentadienyl metallocene compounds for use in the catalyst system include:
dimethylsilyl (tetramethylcyclopentadienyl)(cyclododecylamido)titanium dimethyl;
dimethylsilyl (tetramethylcyclopentadienyl)(cyclododecylamido)titanium dichloride;
dimethylsilyl (tetramethylcyclopentadienyl)(t-butylamido) titanium dimethyl;
dimethylsilyl (tetramethylcyclopentadienyl)(t-butylamido) titanium dichloride;
μ-$(CH_3)_2$Si(cyclopentadienyl)(1-adamantylamido)M(R)$_2$;
μ-$(CH_3)_2$Si(3-tertbutylcyclopentadienyl)(1-adamantylamido)M(R)$_2$;
μ-$(CH_3)_2$(tetramethylcyclopentadienyl)(1-adamantylamido)M(R)$_2$;
μ-$(CH_3)_2$Si(tetramethylcyclopentadienyl)(1-adamantylamido)M(R)$_2$;
μ-$(CH_3)_2$C(tetramethylcyclopentadienyl)(1-adamantylamido)M(R)$_2$;
μ-$(CH_3)_2$Si(tetramethylcyclopentadienyl)(1-tertbutylamido)M(R)$_2$;
μ-$(CH_3)_2$Si(fluorenyl)(1-tertbutylamido)M(R)$_2$;
μ-$(CH_3)_2$Si(tetramethylcyclopentadienyl)(1-cyclododecylamido)M(R)$_2$; and
μ-$(C_6H_5)_2$C(tetramethylcyclopentadienyl)(1-cyclododecylamido)M(R)$_2$,
where M is selected from a group consisting of Ti, Zr, and Hf and R is selected from halogen or C1 to C5 alkyl, preferably R is a methyl group.

Useful metallocene compounds having two cyclopentadienyl rings are represented by the formula:

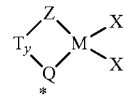

wherein:
M is the same as M described above, preferably M is titanium, zirconium or hafnium, Zr or Hf;

Z and Q* are, independently, a substituted or unsubstituted Cp group (useful Z and Q* groups are represented by the formula: $(C_5H_{4-d}S^*_d)$, where d is 1, 2, 3 or 4, S* is hydrocarbyl groups, heteroatoms, or heteroatom containing groups, such as methyl, ethyl, propyl, butyl, pentyl, hexyl, heptyl, octyl, nonyl, decyl, undecyl, dodecyl, or an isomer thereof, N, O, S, P, or a $C_1$ to $C_{20}$ hydrocarbyl substituted with an N, O, S, and/or P heteroatom or heteroatom containing group (typically having up to 12 atoms, including the N, O, S, and P heteroatoms) and two S* may form a cyclic or multicyclic group;

T is a bridging group as described above that is bonded to Z and Q*, y is zero or one; and each X is a defined in formula XXI.

Particularly useful biscyclopentadienyl metallocene compounds include:
Bis(tetrahydroindene)Hf Me$_2$;
Bis(1-butyl,3-methylcyclopentadienyl)ZrCl$_2$;
Bis-(n-butylcyclopentadienyl)ZrCl$_2$;
(Dimethylsilyl)$_2$O bis(indenyl)ZrCl$_2$;
Dimethylsilyl(3-(3-methylbutyl)cyclopentadienyl)(2,3,4,5-tetramethylcyclopentadienyl)ZrCl$_2$;
Dimethylsilylbis(tetrahydroindenyl)ZrCl$_2$;
Dimethylsilyl-(3-phenyl-indenyl)(tetramethylcyclopentadienyl)ZrCl$_2$;
Dimethylsilyl(3-neopentylcyclopentadienyl)(tetramethylcyclopentadienyl)HfCl$_2$;
Tetramethyldisilylene bis(4-(3,5-di-tert-butylphenyl)-indenyl)ZrCl$_2$;
Dimethylsilylbis(indenyl)ZrCl$_2$;
Dimethylsilylbis(indenyl)HfCl$_2$; and
Cyclopentadienyl(1,3-diphenylcyclopentadienyl)ZrCl$_2$.

Particularly useful metallocenes include those selected from the group consisting of:
bis(cyclopentadienyl)zirconium dichloride, bis(pentamethylcyclopentadienyl)zirconium dichloride, bis(pentamethylcyclopentadienyl)zirconium dimethyl, bis(penta-methylcyclopentadienyl)hafnium dichloride, bis(pentamethylcyclopentadienyl)zirconium dimethyl, bis(1-methyl-3-n-butylcyclopentadienyl)zirconium dichloride, bis(1-methyl-3-n-butylcyclopentadienyl)zirconium dimethyl, bis(1-methyl-3-n-butylcyclopentadienyl)hafnium dichloride, bis(1-methyl-3-n-butylcyclopentadienyl)zirconium dimethyl, bis(indenyl) zirconium dichloride, bis(indenyl) zirconium dimethyl, bis(tetrahydro-1-indenyl)zirconium dichloride, bis(tetrahydro-1-indenyl)zirconium dimethyl, dimethylsilylbis(tetra-hydroindenyl)zirconium dichloride, dimethylsilylbis(tetrahydroindenyl)zirconium dimethyl, dimethylsilylbis(indenyl)zirconium dichloride, dimethylsilyl(bisindenyl)zirconium dimethyl, dimethylsilylbis(cyclopentadienyl)zirconium dichloride, dimethylsilylbis(cyclopentadienyl) zirconium dimethyl, dimethylsilylbis(2- methyl-4-phenyl indenyl)zirconium dichloride, and dimethylsilylbis(2-methyl-4-phenyl indenyl)zirconium dimethyl.

Particularly useful metallocenes include those selected from the group consisting of: bis(indenyl)zirconium dichloride; bis(indenyl)zirconium dimethyl; bis(indenyl)hafnium dichloride; bis(indenyl)hafnium dimethyl; 1, 1'-bis(4-triethylsilylphenyl)methylene-(cyclopentadienyl)(3,8-di-tertiary-butyl-1-fluorenyl)hafnium dimethyl (assuming the bridge is considered the 1 position); and 1, 1'-bis(4-triethylsilylphenyl)methylene-(cyclopentadienyl)(3,8-di-tertiary-butyl-1-fluorenyl)hafnium dichloride (assuming the bridge is considered the 1 position). For additional useful catalysts please see U.S. Pat. No. 6,506,857.

Synthesis of monocyclopentadienyl complexes is known in the art, and for example, has been disclosed in WO 93/19103, U.S. Pat. Nos. 5,096,867, and 5,264,405.

Synthesis of bis cyclopentadienyl complexes is known in the art, and for example, has been disclosed in U.S. Pat. Nos. 4,530,914; 4,542,199; 4,769,910; 4,808,561; 4,871,705; 4,933,403; 4,937,299; 5,017,714; 5,026,798; 5,057,475; 5,120,867; 5,278,119; 5,304,614; 5,324,800; 5,350,723; 5,391,790; and 7,141,632, each fully incorporated herein by reference.

Other metallocene compounds which may be useful in the processes described herein include those compounds represented by the formula (A):

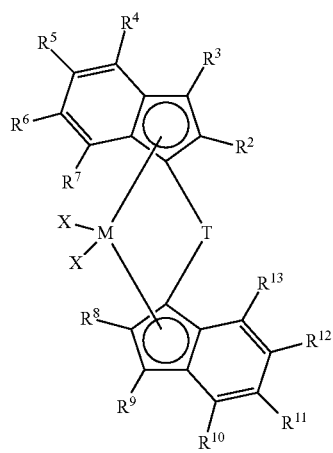

(A)

where:
M is a group 4 metal (preferably Hf, Ti, Zr, preferably Hf or Zr); T is a bridging group;
X is an anionic leaving group; each $R^2$, $R^3$, $R^5$, $R^6$, $R^7$, $R^8$, $R^9$, $R^{11}$, $R^{12}$, and $R^{13}$ is independently, halogen atom, hydrogen, a hydrocarbyl, substituted hydrocarbyl, halocarbyl, substituted halocarbyl, silylcarbyl, substituted silylcarbyl, germylcarbyl, substituted germylcarbyl substituents or a —$NR'_2$, —SR', —OR', —$OSiR'_3$ or —$PR'_2$ radical, wherein R' is one of a halogen atom, a $C_1$-$C_{10}$ alkyl group, or a $C_6$-$C_{10}$ aryl group, provided that $R^2$ and $R^8$ may not be hydrogen; and $R^4$ and $R^{10}$ are, independently, a substituted or unsubstituted aryl group.

In a preferred embodiment, M may be Hf or Zr; T may be represented by the formula, $(R^*_2G)g$, where each G is C, Si, or Ge, g is 1 or 2, and each $R^*$ is, independently, hydrogen, halogen, $C_1$ to $C_{20}$ hydrocarbyl or a $C_1$ to $C_{20}$ substituted hydrocarbyl, and two or more $R^*$ can form a cyclic structure including aromatic, partially saturated, or saturated cyclic or fused ring system; X may be an anionic leaving group; each $R^3$, $R^5$, $R^6$, $R^7$, $R^9$, $R^{11}$, $R^{12}$, and $R^{13}$ independently may be hydrogen, a hydrocarbyl, substituted hydrocarbyl, halocarbyl, substituted halocarbyl, silylcarbyl, substituted silylcarbyl, germylcarbyl, or substituted germylcarbyl substituents, provided that $R^2$ and $R^8$ are independently a $C_1$ to $C_{20}$ hydrocarbyl group; and $R_4$ and $R_{10}$ are, independently, a substituted or unsubstituted aryl, preferably a substituted or unsubstituted phenyl group.

In one embodiment, M may be Zr or Hf.

In another embodiment, each X independently may be selected from the group consisting of hydrocarbyl radicals having from 1 to 20 carbon atoms, hydrides, amides, alkoxides, sulfides, phosphides, halides, dienes, amines, phosphines, ethers, and a combination thereof, (two X's may form a part of a fused ring or a ring system), preferably each X is independently selected from halides and $C_1$ to $C_5$ alkyl groups, preferably each X is a methyl group.

In a preferred embodiment of any embodiment of formula (A), each $R^3$, $R^5$, $R^6$, $R^7$, $R^9$, $R^{11}$, $R^{12}$, or $R^{13}$ independently may be hydrogen or a substituted hydrocarbyl group or unsubstituted hydrocarbyl group, or a heteroatom, preferably hydrogen, methyl, ethyl, propyl, butyl, pentyl, hexyl, or an isomer thereof.

In a preferred embodiment of any embodiment of formula (A), each $R^3$, $R^4$, $R^5$, $R^6$, $R^7$, $R^9$, $R^{10}$, $R^{11}$, $R^{12}$, or $R^{13}$ independently may be selected from hydrogen, methyl, ethyl, phenyl, benzyl, cyclobutyl, cyclopentyl, cyclohexyl, naphthyl, anthracenyl, carbazolyl, indolyl, pyrrolyl, cyclopenta[b]thiopheneyl, fluoro, chloro, bromo, iodo and isomers of propyl, butyl, pentyl, hexyl, heptyl, octyl, nonyl, decyl, methylphenyl, dimethylphenyl, ethylphenyl, diethylphenyl, propylphenyl, dipropylphenyl, butylphenyl, dibutylphenyl, methylbenzyl, methylpyrrolyl, dimethylpyrrolyl, methylindolyl, dimethylindolyl, methylcarbazolyl, dimethylcarbazolyl, methylcyclopenta[b]thiopheneyl, dimethylcyclopenta[b]thiopheneyl.

In a preferred embodiment of any embodiment of formula (A), T is a bridging group and comprises Si, Ge, or C. In a preferred embodiment of any embodiment of formula (A), T is as defined above. Preferably, T is $CH_2$, $CH_2CH_2$, $C(CH_3)_2$, $SiMe_2$, $SiPh_2$, $SiMePh$, silylcyclobutyl $(Si(CH_2)_3)$, (Ph)$_2$C, (p-(Et)$_3$SiPh)$_2$C, cyclopentasilylene $(Si(CH_2)_4)$, or $Si(CH_2)_5$.

In a preferred embodiment of any embodiment of formula (A), each $R^2$ and $R^8$, independently may be a $C_1$ to $C_{20}$ hydrocarbyl, or a $C_1$ to $C_{20}$ substituted hydrocarbyl, $C_1$ to $C_{20}$ halocarbyl, $C_1$ to $C_{20}$ substituted halocarbyl, $C_1$ to $C_{20}$ silylcarbyl, $C_1$ to $C_{20}$ substituted silylcarbyl, $C_1$ to $C_{20}$ germylcarbyl, or $C_1$ to $C_{20}$ substituted germylcarbyl substituents. Preferably, each $R^2$ and $R^8$, is independently, methyl, ethyl, propyl, butyl, pentyl, hexyl, heptyl, octyl, nonyl, decyl, undecyl, docedyl or an isomer thereof, preferably cyclopropyl, cyclohexyl, (1-cyclohexyl methyl) methyl, isopropyl, and the like.

In a preferred embodiment of any embodiment of formula (A), $R^4$ and $R^{10}$ independently may be a substituted or unsubstituted aryl group. Preferred substituted aryl groups include aryl groups where a hydrogen has been replaced by a hydrocarbyl, or a substituted hydrocarbyl, halocarbyl, substituted halocarbyl, silylcarbyl, substituted silylcarbyl, germylcarbyl, or substituted germylcarbyl substituents, a heteroatom or heteroatom containing group.

Examples of aryl and substituted aryl groups include phenyl, naphthyl, anthraceneyl, 2-methylphenyl, 3-methylphenyl, 4-methylphenyl, 2,3-dimethylphenyl, 2,4-dimethylphenyl, 2,5-dimethylphenyl, 2,6-dimethylphenyl, 3,4-dimethylphenyl, 3,5-dimethylphenyl, 2,4,5-trimethylphenyl, 2,3,4,5,6-pentamethylphenyl, 2-ethylphenyl, 3-ethylphenyl, 4-ethylphenyl, 2,3-diethylphenyl, 2,4-diethylphenyl, 2,5-diethylphenyl, 2,6-diethylphenyl, 3,4-diethylphenyl, 3,5-diethylphenyl, 3-isopropylphenyl, 4-isopropylphenyl, 3,5-diisopropylphenyl, 2,5-di-isopropylphenyl, 2-tert-butylphenyl, 3-tert-butylphenyl, 4-tert-butylphenyl, 3,5-di-tert-butylphenyl, 2,5-di-tert-butylphenyl, cyclopropyl, cyclobutyl, cyclopentyl, cyclohexyl, carbazolyl, indolyl, pyrrolyl, and cyclopenta[b]thiopheneyl. Preferred aryl groups include phenyl, benzyl, carbozyl, naphthyl, and the like.

In a preferred embodiment of any embodiment of formula (A), $R^2$ and $R^8$ may be $C_1$ to $C_{20}$ hydrocarbyl, such as methyl, ethyl, propyl, butyl, pentyl, hexyl, heptyl, octyl, nonyl, decyl, undecyl, docedyl, or an isomer thereof, preferably cyclopropyl, cyclohexyl, (1-cyclohexyl methyl) methyl, or isopropyl; and $R^4$ and $R^{10}$ independently may be selected from phenyl, naphthyl, anthraceneyl, 2-methylphenyl, 3-methylphenyl, 4-methylphenyl, 2,3-dimethylphenyl, 2,4-dimethylphenyl, 2,5-dimethylphenyl, 2,6-dimethylphenyl, 3,4-dimethylphenyl, 3,5-dimethylphenyl, 2,4,5-trimethylphenyl, 2,3,4,5,6-pentamethylphenyl, 2-ethylphenyl, 3-ethylphenyl, 4-ethylphenyl, 2,3-diethylphenyl, 2,4-diethylphenyl, 2,5-diethylphenyl, 2,6-diethylphenyl, 3,4-diethylphenyl, 3,5-diethylphenyl, 3-isopropylphenyl, 4-isopropylphenyl, 3,5-di-isopropylphenyl, 2,5-di-isopropylphenyl, 2-tert-butylphenyl, 3-tert-butylphenyl, 4-tert-butylphenyl, 3,5-di-tert-butylphenyl, 2,5-di-tert-butylphenyl, cyclopropyl, cyclobutyl, cyclopentyl, cyclohexyl, carbazolyl, indolyl, pyrrolyl, cyclopenta[b]thiopheneyl. In a preferred embodiment, $R^2$, $R^8$, $R^4$ and $R^{10}$ are as described in the preceding sentence and $R^3$, $R^5$, $R^6$, $R^7$, $R^9$, $R^{11}$, $R^{12}$, and $R^{13}$ are hydrogen.

Metallocene compounds that are particularly useful in polymerization process include one or more of: dimethylsilylene-bis(2-cyclopropyl-4-phenylindenyl)zirconium dichloride; dimethylsilylene-bis(2-cyclopropyl-4-phenylindenyl)hafnium dichloride; dimethylsilylene-bis(2-methyl-4-phenylindenyl)zirconium dichloride; dimethylsilylene-bis(2-methyl-4-phenylindenyl)hafnium dichloride; dimethylsilylene-bis(2-methyl-4-orthobipheny-lindenyl) hafnium dichloride; dimethylsilylene-bis(2-methyl-4-ortho-biphenylindenyl) zirconium dichloride; dimethylsilylene-(2-cyclopropyl-4-orthobiphenylindenyl)(2-methyl-4-3',5'-di-t-butylphenylindenyl)hafnium dichloride; dimethylsilylene-(2-cyclopropyl-4-orthobiphenylindenyl)(2-methyl-4-3',5'-di-t-butylphenylindenyl)zirconium dichloride; dimethylsilylene-(2-isopropyl-4(4-t-butyl)phenyl)indenyl) (2-methyl-4-phenyl indenyl) zirconium dichloride; dimethylsilylene-(2-isopropyl-4(4-t-butyl)phenyl)indenyl) (2-methyl-4-phenyl indenyl) hafnium dichloride; dimethylsilylene-(2-isopropyl-4(4-t-butyl) phenyl)indenyl) (2-methyl, 4-t-butylindenyl) zirconium dichloride; dimethylsilylene-(2-isopropyl-4(4-t-butyl)phenyl)indenyl) (2-methyl, 4-t-butylindenyl) hafnium dichloride; dimethylsilylene-(2-isopropyl-4(4-t-butyl)phenyl)indenyl) (2-methyl-4-phenylindacenyl) zirconium dichloride; dimethylsilylene-(2-isopropyl-4(4-t-butyl)phenyl)indenyl) (2-methyl-4-phenylindacenyl) hafnium dichloride; dimethylsilylene (4-o-Biphenyl-2-(1-methyl-cyclohexyl)methyl-indenyl) (4-(3,5-di-tert-butylphenyl)-2-methyl-indenyl) zirconium dichloride; and dimethylsilylene (4-o-Biphenyl-2-(1-methylcyclohexyl)methyl-indenyl) (4-(3,5-di-tert-butylphenyl)-2-methyl-indenyl) hafnium dichloride; where, in alternate embodiments, the dichloride in any of the compounds listed above may be replaced with dialkyl (such as dimethyl), dialkaryl, diflouride, diiodide, or dibromide, or a combination thereof.

In a preferred embodiment in any of the processes described herein, one metallocene compound may be used, e.g., the metallocene compounds are not different. For purposes of this disclosure one metallocene compound is considered different from another if they differ by at least one atom. For example "bisindenyl zirconium dichloride" is different from "(indenyl)(2-methylindenyl) zirconium dichloride," which is different from "(indenyl)(2-methylindenyl) hafnium dichloride." Metallocene compounds that differ only by isomer are considered the same for purposes if this disclosure, e.g., rac-dimethylsilylbis(2-methyl 4-phenyl)hafnium dimethyl is considered to be the same as meso-dimethylsilylbis(2-methyl 4-phenyl)hafnium dimethyl.

3. Ziegler-Natta Catalyst

Suitable catalysts for use in the processes and systems disclosed herein include Ziegler-Natta catalysts comprising 1) a solid titanium catalyst component comprising a titanium compound, a magnesium compound, and an internal electron donor; 2) a co-catalyst such as an organoaluminum compound; and 3) external electron donor(s). Ziegler-Natta catalysts, catalyst systems, and preparations thereof include supported catalyst systems described in U.S. Pat. Nos. 4,990,479, 5,159,021, and WO 00/44795, preferably including solid titanium and or magnesium. For example, useful Ziegler-Natta catalysts are typically composed of a transition metal compound from groups 4, 5, 6, and/or 7 (preferably group 4) and an organometallic compound of a metal from groups 11, 12, and/or 13 (preferably group 13) of the periodic table. Well-known examples include $TiCl_3$-$Et_2AlCl$, $AlR_3$—$TiCl_4$ wherein Et is an ethyl group and R represents an alkyl group, typically a $C_1$-$C_{20}$ alkyl group, such as methyl, ethyl, propyl, butyl, pentyl, hexyl, octyl and the like. These catalysts include mixtures of halides of transition metals, especially titanium, chromium, vanadium, and zirconium, with organic derivatives of nontransition metals, particularly alkyl aluminum compounds.

Briefly, the Ziegler-Natta catalysts can be obtained by: (1) suspending a dialkoxy magnesium compound in an aromatic hydrocarbon that is liquid at ambient temperatures; (2) contacting the dialkoxy magnesium-hydrocarbon composition with a titanium halide and with a diester of an aromatic dicarboxylic acid; and (3) contacting the resulting functionalized dialkoxy magnesiumhydrocarbon composition of step (2) with additional titanium halide.

The Ziegler-Natta catalyst is typically combined with a co-catalyst which is preferably an organoaluminum compound that is halogen free. Suitable halogen free organoaluminum compounds are, in particular, branched unsubstituted alkylaluminum compounds of the formula $AlR_3$, where R denotes an alkyl radical having 1 to 20 carbon atoms (preferably methyl, ethyl, propyl, butyl, pentyl, hexyl, octyl, and the like), such as for example, trimethylaluminum, triethylaluminum, triisobutylaluminum and tridiisobutylaluminum. Additional compounds that are suitable for use as a cocatalyst are readily available and amply disclosed in the prior art including U.S. Pat. No. 4,990,477, which is incorporated herein by reference. The same or different Ziegler-Natta catalyst(s) can be used in both the initial and subsequent polymerization steps. In a preferred embodiment, the solid catalyst is a magnesium supported $TiCl_4$ catalyst and the organoaluminum co-catalyst is triethylaluminum.

Electron donors are also typically used in two ways in the formation of Ziegler-Natta catalysts and catalyst systems.

An internal electron donor may be used in the formation reaction of the catalyst as the transition metal halide is reacted with the metal hydride or metal alkyl. Examples of internal electron donors include amines, amides, ethers, esters, aromatic esters, ketones, nitriles, phosphines, stilbenes, arsines, phosphoramides, thioethers, thioesters, aldehydes, alcoholates, and salts of organic acids. In conjunction with an internal donor, an external electron donor may also be used in combination with a catalyst. External electron donors often affect the level of stereoregularity in polymerization reactions.

The second use for an electron donor in a catalyst system is as an external electron donor and stereoregulator in the polymerization reaction. The same compound may be used in both instances, although typically they are different. Preferred External electron donor materials may include organic silicon compounds, e.g. tetraethoxysilane (TEOS) and dicyclopentydimethoxysilane (DCPMS). Internal and external-type electron donors are described, for example, in U.S. Pat. No. 4,535,068, which is incorporated herein by reference. The use of organic silicon compounds as external electron donors are described, for example, in U.S. Pat. Nos. 4,218,339; 4,395,360; 4,328,122; 4,473,660; 6,133,385; and 6,127,303, all of which are incorporated herein by reference. Particularly useful electron donors include external electron donors used as stereoregulators, in combination with Ziegler-Natta catalysts.

A particularly useful Ziegler-Natta catalyst is a magnesium chloride supported titanium catalyst selected from the group of THC-C type catalyst solid systems available from Toho Titanium Corporation of Japan. Particularly preferred donor systems include those described in U.S. Pat. No. 6,087,459, such as for example, a blend of propyltriethoxysilane (PTES) and dicyclopentyldimethoxysilane (DCPMS), typically a 95/5 mole % blend. Another useful donor is methylcyclohexyl di-methoxysilane (MCMS).

A particular Ziegler-Natta catalyst may produce better results when paired with a particular group of electron donors. Examples of this paring of catalyst and electron donors are disclosed in U.S. Pat. Nos. 4,562,173 and 4,547,552, which are incorporated by reference herein.

4. Pyridyldiamido Compound

Another suitable catalyst for use in the processes and systems disclosed herein include pyridyldiamido compounds. The term "pyridyldiamido compound," "pyridyldiamido complex," "pyridyldiamide complex," "pyridyldiamido catalyst," or pyridyldiamide catalyst" refers to a class of coordination complexes described in U.S. Pat. No. 7,973,116 B2; US 2012/0071616 A1; US 2011/0224391 A1; US 2011/0301310 A1; US 2014/0221587 A1; US 2014/0256893 A1; US 2014/0316089 A1; US 2015/0141590 A1; and US 2015/0141601 A1 that feature a dianionic tridentate ligand that is coordinated to a metal center through one neutral Lewis basic donor atom (e.g., a pyridine group) and a pair of anionic amido or phosphido (i.e., deprotonated amine or phosphine) donors. In these complexes, the pyridyldiamido ligand is coordinated to the metal with the formation of one five-membered chelate ring and one seven-membered chelate ring. It is possible for additional atoms of the pyridyldiamido ligand to be coordinated to the metal without affecting the catalyst function upon activation; an example of this could be a cyclometalated substituted aryl group that forms an additional bond to the metal center.

In one aspect, the catalyst system comprises a pyridyldiamido transition metal complex represented by the Formula:

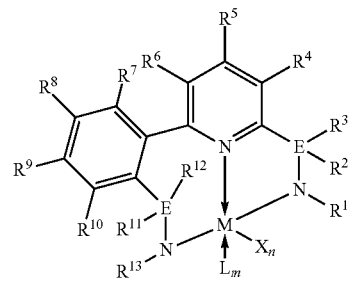

wherein:
M is a Group 4 metal (preferably hafnium);
E is selected from carbon, silicon, or germanium (preferably carbon);
X is an anionic leaving group (preferably alkyl, aryl, hydride, alkylsilane, fluoride, chloride, bromide, iodide, triflate, carboxylate, alkylsulfonate);
L is a neutral Lewis base (preferably ether, amine, thioether);
$R^1$ and $R^{13}$ are independently selected from the group consisting of hydrocarbyls, substituted hydrocarbyls, and silyl groups (preferably aryl);
$R^2$ through $R^{12}$ are independently selected from the group consisting of hydrogen, hydrocarbyls, alkoxy, silyl, amino, aryloxy, substituted hydrocarbyls, halogen, and phosphino;
n is 1 or 2;
m is 0, 1, or 2;
two X groups may be joined together to form a dianionic group;
two L groups may be joined together to form a bidentate Lewis base;
an X group may be joined to an L group to form a monoanionic bidentate group;
$R^7$ and $R^8$ may be joined to form a ring (preferably an aromatic ring, a six membered aromatic ring with the joined $R^7R^8$ group being —CH=CHCH=CH—); and
$R^{10}$ and $R^{11}$ may be joined to form a ring (preferably a five membered ring with the joined $R^{10}R^{11}$ group being —CH$_2$CH$_2$—, a six membered ring with the joined $R^{10}R^{11}$ group being —CH$_2$CH$_2$CH$_2$—).

Preferably, $R^4$, $R^5$, and $R^6$ are independently selected from the group consisting of hydrogen, hydrocarbyls, substituted hydrocarbyls, alkoxy, aryloxy, halogen, amino, and silyl, and wherein adjacent R groups ($R^4$ & $R^5$ and/or $R^5$ & $R^6$) may be joined to form a substituted or unsubstituted hydrocarbyl or heterocyclic ring, where the ring has 5, 6, 7, or 8 ring atoms and where substitutions on the ring can join to form additional rings; and/or $R^7$, $R^8$, $R^9$, and $R^{10}$ are independently selected from the group consisting of hydrogen, hydrocarbyls, substituted hydrocarbyls, alkoxy, halogen, amino, and silyl, and wherein adjacent R groups ($R^7$ & $R^8$, and/or $R^9$ & $R^{10}$) may be joined to form a saturated, substituted or unsubstituted hydrocarbyl or heterocyclic ring, where the ring has 5, 6, 7, or 8 ring carbon atoms and where substitutions on the ring can join to form additional rings; and/or
n+m is not greater than 4; and/or
$R^2$ and $R^3$ are each, independently, selected from the group consisting of hydrogen, hydrocarbyls, and substituted hydrocarbyls, alkoxy, silyl, amino, aryloxy, halogen, and phosphino, $R^2$ and $R^3$ may be joined to form a saturated, substituted or unsubstituted hydrocarbyl ring, where the ring has 4, 5, 6, or 7 ring carbon atoms and where substitutions on the ring can join to form additional rings, or $R^2$ and $R^3$ may be joined to form a saturated heterocyclic ring, or a saturated substituted heterocyclic ring where substitutions on the ring can join to form additional rings; and/or $R^{11}$ and $R^{12}$ are each, independently, selected from the group consisting of hydrogen, hydrocarbyls, and substituted hydrocarbyls, alkoxy, silyl, amino, aryloxy, halogen, and phosphino, $R^{11}$ and $R^{12}$ may be joined to form a saturated, substituted or unsubstituted hydrocarbyl ring, where the ring has 4, 5, 6, or 7 ring carbon atoms and where substitutions on the ring can join to form additional rings, or $R^{11}$ and $R^{12}$ may be joined to form a saturated heterocyclic ring, or a saturated substituted heterocyclic ring where substitutions on the ring can join to form additional rings; and/or $R^1$ and $R^{13}$ may be independently selected from phenyl groups that are variously substituted with between zero to five substituents that include F, Cl, Br, I, $CF_3$, $NO_2$, alkoxy, dialkylamino, aryl, and alkyl groups having 1 to 10 carbons, such as methyl, ethyl, propyl, butyl, pentyl, hexyl, heptyl, octyl, nonyl, decyl, and isomers thereof.

Preferred $R^3$-E-$R^2$ groups and preferred $R^{12}$-E-$R^{11}$ groups include $CH_2$, $CMe_2$, $SiMe_2$, $SiEt_2$, $SiPr_2$, $SiBu_2$, $SiPh_2$, $Si(aryl)_2$, $Si(alkyl)_2$, $CH(aryl)$, $CH(Ph)$, $CH(alkyl)$, and $CH(2-isopropylphenyl)$, where alkyl is a $C_1$ to $C_{40}$ alkyl group (preferably $C_1$ to $C_{20}$ alkyl, preferably one or more of methyl, ethyl, propyl, butyl, pentyl, hexyl, heptyl, octyl, nonyl, decyl, undecyl, dodecyl, and isomers thereof), aryl is a $C_5$ to $C_{40}$ aryl group (preferably a $C_6$ to $C_{20}$ aryl group, preferably phenyl or substituted phenyl, preferably phenyl, 2-isopropylphenyl, or 2-tertbutylphenyl).

Preferred compounds useful as catalysts herein include the pyridyldiamide complexes described in US 2014/0221587 A1 and US 2015/0141601A1.

In some embodiments, two or more different catalyst compounds are present in the catalyst system used herein. In some embodiments, two or more different catalyst compounds are present in the reaction zone where the process(es) described herein occur. When two transition metal compound based catalysts are used in one reactor as a mixed catalyst system, the two transition metal compounds are preferably chosen such that the two are compatible. A simple screening method such as by $^1H$ or $^{13}C$ NMR, known to those of ordinary skill in the art, can be used to determine which transition metal compounds are compatible. It is preferable to use the same activator for the transition metal compounds, however, two different activators, such as a non-coordinating anion activator and an alumoxane, can be used in combination. If one or more transition metal compounds contain an $X_1$ or $X_2$ ligand which is not a hydride, hydrocarbyl, or substituted hydrocarbyl, then the alumoxane is typically contacted with the transition metal compounds prior to addition of the non-coordinating anion activator.

The two transition metal compounds (pre-catalysts) may be used in any ratio. Preferred molar ratios of (A) transition metal compound to (B) transition metal compound fall within the range of (A:B) 1:1000 to 1000:1, alternatively 1:100 to 500:1, alternatively 1:10 to 200:1, alternatively 1:1 to 100:1, and alternatively 1:1 to 75:1, and alternatively 5:1 to 50:1. The particular ratio chosen will depend on the exact pre-catalysts chosen, the method of activation, and the end product desired. In a particular embodiment, when using the two pre-catalysts, where both are activated with the same activator, useful mole percents, based upon the molecular weight of the pre-catalysts, are 10 to 99.9% A to 0.1 to 90% B, alternatively 25 to 99% A to 0.5 to 50% B, alternatively 50 to 99% A to 1 to 25% B, and alternatively 75 to 99% A to 1 to 10% B.

In another embodiment, the bulky ligand metallocene catalyst compounds are those described in PCT publications WO 99/01481 and WO 98/42664, which are fully incorporated herein by reference.

Useful Group 6 bulky ligand metallocene catalyst systems are described in U.S. Pat. No. 5,942,462, which is incorporated herein by reference.

Still other useful catalysts include those multinuclear metallocene catalysts as described in WO 99/20665 and U.S. Pat. No. 6,010,794, and transition metal metaaracyle structures described in EP 0 969 101 A2, which are incorporated herein by reference. Other metallocene catalysts include those described in EP 0 950 667 A1, double cross-linked metallocene catalysts (EP 0 970 074 A1), tethered metallocenes (EP 970 963 A2) and those sulfonyl catalysts described in U.S. Pat. No. 6,008,394, which are incorporated herein by reference.

It is also contemplated that in one embodiment the bulky ligand metallocene catalysts, described above include their structural or optical or enantiomeric isomers (meso and racemic isomers, for example, see U.S. Pat. No. 5,852,143, incorporated herein by reference) and mixtures thereof.

It is further contemplated that any one of the bulky ligand metallocene catalyst compounds, described above, have at least one fluoride or fluorine containing leaving group as described in U.S. Pat. No. 6,632,901.

The Group 15 containing metal compounds utilized in the catalyst composition can be prepared by methods known in the art, such as those disclosed in EP 0 893 454 A1; U.S. Pat. No. 5,889,128; and the references cited in U.S. Pat. No. 5,889,128; which are all incorporated herein by reference. U.S. Pat. No. 6,271,325 discloses a gas or slurry phase polymerization process using a supported bisamide catalyst, which is also incorporated herein by reference.

For additional information of Group 15 containing metal compounds, please see Mitsui Chemicals, Inc. in EP 0 893 454 A1, which discloses transition metal amides combined with activators to polymerize olefins.

In one embodiment, the Group 15 containing metal compound is allowed to age prior to use as a polymerization. It has been noted on at least one occasion that one such catalyst compound (aged at least 48 hours) performed better than a newly prepared catalyst compound.

It is further contemplated that bis-amide based pre-catalysts may be used. Exemplary compounds include those described in the patent literature. International patent publications WO 96/23010; WO 97/48735; and Gibson et al. (1998) *Chem. Comm.* pp. 849-50, which disclose diimine-based ligands for Group 8-10 compounds that undergo ionic activation and polymerize olefins. Polymerization catalyst systems from Group 5-10 metals, in which the active center is highly oxidized and stabilized by low-coordination-number, polyanionic, ligand systems, are described in U.S. Pat. No. 5,502,124 and its divisional U.S. Pat. No. 5,504,049. See also the Group 5 organometallic catalyst compounds of U.S. Pat. No. 5,851,945 and the tridentate-ligand-containing, Group 5-10, organometallic catalysts of U.S. Pat. No. 6,294,495. Group 11 catalyst precursor compounds, activatable with ionizing cocatalysts, useful for olefin and vinylic polar molecules are described in WO 99/30822.

Other useful catalyst compounds are those Group 5 and 6 metal imido complexes described in EP-A2-0 816 384 and U.S. Pat. No. 5,851,945, which are incorporated herein by reference. In addition, metallocene catalysts include bridged bis(arylamido) Group 4 compounds described by McConville et al. (1995) *Organometallics* 14:5478-80, which is herein incorporated by reference. In addition, bridged bis (amido) catalyst compounds are described in WO 96/27439, which is herein incorporated by reference. Other useful catalysts are described as bis(hydroxy aromatic nitrogen ligands) in U.S. Pat. No. 5,852,146, which is incorporated herein by reference. Other useful catalysts containing one or more Group 15 atoms include those described in WO 98/46651, which is herein incorporated herein by reference.

U.S. Pat. No. 5,318,935 describes bridged and unbridged, bisamido catalyst compounds of Group 4 metals capable of α-olefins polymerization. Bridged bi(arylamido) Group 4 compounds for olefin polymerization are described by McConville et al. (1995) *Organometallics* 14:5478-80. This reference presents synthetic methods and compound characterizations. Further work appearing in McConville et al. (1996) *Macromolecules* 29:5241-43, describes bridged bis (arylamido) Group-4 compounds that are polymerization catalysts for 1-hexene. Additional suitable transition metal compounds include those described in WO 96/40805. Cationic Group 3 or Lanthanide-metal olefin polymerization complexes are disclosed in U.S. Ser. No. 09/408,050. A monoanionic bidentate ligand and two monoanionic ligands stabilize those catalyst precursors, which can be activated with ionic cocatalysts.

The literature describes many additional suitable 1 catalyst-precursor compounds. Compounds that contain abstractable ligands or that can be alkylated to contain abstractable ligands. See, for instance, V. C. Gibson, et al; "The Search for New-Generation Olefin Polymerization Catalysts: Life Beyond Metallocenes," *Angew. Chem. Int. Ed.*, 38, pp. 428-447, (1999).

In certain embodiments, catalysts may contain phenoxide ligands such as those disclosed in EP 0 874 005 A1, which in incorporated herein by reference.

Certain useful catalysts are disclosed in U.S. Pat. No. 7,812,104; WO 2008/079565; WO 2008/109212; U.S. Pat. Nos. 7,354,979; 7,279,536; 7,812,104; and 8,058,371; which are incorporated herein by reference.

Particularly useful metallocene catalyst and non-metallocene catalyst compounds are those disclosed in paragraphs [0081] to [0111] of U.S. Ser. No. 10/667,585 (U.S. Pat. No. 7,354,979) and paragraphs [0173] to [0293] of U.S. Ser. No. 11/177,004 (US 2006/0025545), the paragraphs of which are fully incorporated herein by reference.

Metallocene catalyst compounds useful herein, please see U.S. Pat. Nos. 7,812,104 and 6,506,857, which are incorporated herein by reference.

Useful catalyst compounds include one, two, three, or more of:
dimethylsilyl-bis[2-methyl-4-(carbazol-9-yl)inden-1-yl]zirconiumdimethyl,
dimethylsilyl-bis[2-methyl-4-(carbazol-9-yl)inden-1-yl]zirconium dichloride,
μ-dimethyl silylbis(2-methyl, 4-phenylindenyl) zirconium (or hafnium) dichloride,
μ-dimethyl silylbis(2-methyl, 4-phenylindenyl) zirconium (or hafnium) dimethyl,
μ-dimethyl silylbis(2-methyl, 4-(3',5'-di-t-butylphenyl)indenyl) zirconium (or hafnium) dimethyl,
μ-dimethyl silylbis(2-methyl, 4-(3',5'-di-t-butylphenyl)indenyl) zirconium (or hafnium) dichloride,
1, 1'-bis(4-triethylsilylphenyl)methylene-(cyclopentadienyl) (2,7-di-tertiary-butyl-9-fluorenyl)hafnium dichloride,
1, 1'-bis(4-triethylsilylphenyl)methylene-(cyclopentadienyl) (2,7-di-tertiary-butyl-9-fluorenyl)hafnium dimethyl,
dimethylsilyl(tetramethylcyclopentadienyl)(cyclododecylamido)titanium dimethyl,
dimethylsilyl(tetramethylcyclopentadienyl)(cyclododecylamido)titanium dichloride,
1, 1'-bis(4-triethylsilylphenyl)methylene-(cyclopentadienyl) (2,7-di-tertiary-butyl-9-fluorenyl)hafnium dichloride,
1, 1'-bis(4-triethylsilylphenyl)methylene-(cyclopentadienyl) (2,7-di-tertiary-butyl-9-fluorenyl)hafnium dimethyl,
dimethylsilylbis(indenyl)hafnium dichloride,
dimethylsilylbis(indenyl)hafnium dimethyl,
dimethylsilyl bis(2-methylindenyl) zirconium dichloride,
dimethylsilyl bis(2-methylindenyl) zirconium dimethyl,
dimethylsilyl bis(2-methylfluorenyl) zirconium dichloride,
dimethylsilyl bis(2-methylfluorenyl) zirconium dimethyl,
dimethylsilyl bis(2-methyl-5,7-propylindenyl) zirconium dichloride,
dimethylsilyl bis(2-methyl-5,7-propylindenyl) zirconium dimethyl,
dimethylsilyl bis(2-methyl-5-phenylindenyl) zirconium dichloride,
dimethylsilyl bis(2-methyl-5-phenylindenyl) zirconium dimethyl,
dimethylsilyl bis(2-ethyl-5-phenylindenyl) zirconium dichloride,
dimethylsilyl bis(2-ethyl-5-phenylindenyl) zirconium dimethyl,
dimethylsilyl bis(2-methyl-5-biphenylindenyl) zirconium dichloride, and
dimethylsilyl bis(2-methyl-5-biphenylindenyl) zirconium dimethyl.

In a useful embodiment, the coordination catalyst is 1, 1'-bis(4-triethylsilylphenyl)methylene-(cyclopentadienyl) (3,8-di-tertiary-butyl-1-fluorenyl) hafnium chloride, or 1, 1'-bis(4-triethylsilylphenyl)methylene-(cyclopentadienyl) (3,8-di-tertiary-butyl-1-fluorenyl) hafnium dimethyl (numbering assumes the bridge is the 1 position).

In some embodiments, two or more different catalyst compounds are present in the catalyst system used herein. In some embodiments, two or more different catalyst compounds are present in the reaction zone where the process(es) described herein occur. When two transition metal compound-based catalysts are used in one reactor as a mixed catalyst system, the two transition metal compounds are preferably chosen such that the two are compatible. A simple screening method such as by $^1$H or $^{13}$C NMR, known to those of ordinary skill in the art, can be used to determine which transition metal compounds are compatible. It is preferable to use the same activator for the transition metal compounds, however, two different activators, such as a non-coordinating anion activator and an alumoxane, can be used in combination. If one or more transition metal compounds contain an $X_1$ or $X_2$ ligand, which is not a hydride, hydrocarbyl, or substituted hydrocarbyl, then the alumoxane should be contacted with the transition metal compounds prior to addition of the non-coordinating anion activator.

The two transition metal compounds (pre-catalysts) may be used in any ratio. Preferred molar ratios of (A) transition metal compound to (B) transition metal compound fall within the range of (A:B) 1:1000 to 1000:1, alternatively 1:100 to 500:1, alternatively 1:10 to 200:1, alternatively 1:1 to 100:1, and alternatively 1:1 to 75:1, and alternatively 5:1 to 50:1. The particular ratio chosen will depend on the exact pre-catalysts chosen, the method of activation, and the end product desired. In a particular embodiment, when using the two pre-catalysts, where both are activated with the same activator, useful mole percents, based upon the molecular weight of the pre-catalysts, are 10 to 99.9% A to 0.1 to 90%

B, alternatively 25 to 99% A to 0.5 to 50% B, alternatively 50 to 99% A to 1 to 25% B, and alternatively 75 to 99% A to 1 to 10% B.

5. Activators

The terms "co-catalyst" and "activator" are used herein interchangeably and are defined to be any compound which can activate any one of the catalyst precursor compounds described herein by converting the neutral catalyst precursor compound to a catalytically active catalyst compound. Non-limiting activators, for example, include alumoxanes, aluminum alkyls, ionizing activators (also referred to as non-coordinating anion activators), which may be neutral or ionic, and conventional-type co-catalysts. Preferred activators typically include, alumoxane compounds, modified alumoxane compounds, and ionizing anion precursor compounds that abstract a reactive, σ-bound ligand (for example, chloride or alkyl, most often methyl) making the metal complex cationic and providing a charge-balancing noncoordinating or weakly coordinating anion.

5. a. Alumoxanes

In one embodiment, alumoxane activators may be utilized as an activator in the catalyst system. Alumoxanes are generally oligomeric compounds containing —Al($R^1$)—O— sub-units, where $R^1$ is an alkyl group. Examples of alumoxanes include methylalumoxane (MAO), modified methylalumoxane (MMAO), ethylalumoxane and isobutylalumoxane. A useful alumoxane is a modified methyl alumoxane (MMAO) cocatalyst type 3A (commercially available from Akzo Chemicals, Inc. under the trade name Modified Methylalumoxane type 3A, covered under U.S. Pat. No. 5,041,584).

When the activator is an alumoxane (modified or unmodified), some embodiments select the maximum amount of activator typically at up to a 5000-fold molar excess Al/M over the catalyst compound (per metal catalytic site). The minimum activator-to-catalyst-compound is a 1:1 molar ratio. Alternate preferred ranges include from 1:1 to 500:1, alternately from 1:1 to 200:1, alternately from 1:1 to 100:1, or alternately from 1:1 to 50:1.

In an alternate embodiment, little or no alumoxane is used in the polymerization processes described herein. Preferably, alumoxane is present at zero mole %, alternately the alumoxane is present at a molar ratio of aluminum to catalyst compound transition metal less than 500:1, preferably less than 300:1, preferably less than 100:1, preferably less than 1:1.

5. b. Non-Coordinating Anion Activators

The term "non-coordinating anion" (NCA) means an anion which either does not coordinate to a cation or which is only weakly coordinated to a cation by, for example, forming a tight ion pair, thereby remaining sufficiently labile to be displaced by a neutral Lewis base. "Compatible" non-coordinating anions are those which are not degraded to neutrality when the initially formed complex decomposes. Further, the anion will not transfer an anionic substituent or fragment to the cation so as to cause it to form a neutral transition metal compound and a neutral by-product from the anion. Non-coordinating anions useful in the processes and systems disclosed herein are those that are compatible with and stabilize the transition metal cation in the sense of balancing its ionic charge at +1, and yet retain sufficient lability to permit displacement during polymerization.

The processes and methods disclosed herein may employ an ionizing or stoichiometric activator, neutral or ionic, such as tri (n-butyl) ammonium tetrakis (pentafluorophenyl) borate, a tris perfluorophenyl boron metalloid precursor or a tris perfluoronaphthyl boron metalloid precursor, polyhalogenated heteroborane anions (WO 98/43983), boric acid (U.S. Pat. No. 5,942,459), or combinations thereof. Additionally or alternatively, one may use neutral or ionic activators alone or in combination with alumoxane or modified alumoxane activators.

Catalyst systems can include at least one non-coordinating anion (NCA) activator. Specifically, the catalyst systems include one or more NCAs, which either do not coordinate to a cation or which only weakly coordinate to a cation, thereby remaining sufficiently labile to be displaced during polymerization.

In a preferred embodiment boron-containing NCA, activators represented by the formula below can be used:

where: Z is (L-H) or a reducible Lewis acid; L is a neutral Lewis base; H is hydrogen; (L-H) is a Bronsted acid; $A^{d-}$ is a boron-containing, non-coordinating anion having the charge d–; d is 1, 2, or 3.

The cation component, $Z_d^+$ may include Bronsted acids, such as protons or protonated Lewis bases or reducible Lewis acids capable of protonating or abstracting a moiety, such as an alkyl or aryl, from the bulky ligand metallocene containing transition metal catalyst precursor, resulting in a cationic transition metal species.

The activating cation $Z_d^+$ may also be a moiety such as silver, tropylium, carboniums, ferroceniums and mixtures, preferably carboniums and ferroceniums. Most preferably $Z_d^+$ is triphenyl carbonium. Preferred reducible Lewis acids can be any triaryl carbonium (where the aryl can be substituted or unsubstituted, such as those represented by the formula: ($Ar_3C^+$), where Ar is aryl or aryl substituted with a heteroatom, a $C_1$ to $C_{40}$ hydrocarbyl, or a substituted $C_1$ to $C_{40}$ hydrocarbyl), preferably the reducible Lewis acids in formula (14) above as "Z" include those represented by the formula: ($Ph_3C$), where Ph is a substituted or unsubstituted phenyl, preferably substituted with $C_1$ to $C_{40}$ hydrocarbyls or substituted a $C_1$ to $C_{40}$ hydrocarbyls, preferably $C_1$ to $C_{20}$ alkyls or aromatics or substituted $C_1$ to $C_{20}$ alkyls or aromatics, preferably Z is a triphenylcarbonium.

When $Z_d^+$ is the activating cation $(L-H)_d^+$, it is preferably a Bronsted acid, capable of donating a proton to the transition metal catalytic precursor resulting in a transition metal cation, including ammoniums, oxoniums, phosphoniums, silyliums, and mixtures thereof, preferably ammoniums of methylamine, aniline, dimethylamine, diethylamine, N-methylaniline, diphenylamine, trimethylamine, triethylamine, N,N-dimethylaniline, methyldiphenylamine, pyridine, p-bromo N,N-dimethylaniline, p-nitro-N,N-dimethylaniline, phosphoniums from triethylphosphine, triphenylphosphine, and diphenylphosphine, oxoniums from ethers such as dimethyl ether diethyl ether, tetrahydrofuran and dioxane, sulfoniums from thioethers, such as diethyl thioethers, tetrahydrothiophene, and mixtures thereof.

The anion component $A^{d-}$ includes those having the formula $[M^k+Q_n]^{d-}$ wherein k is 1, 2, or 3; n is 1, 2, 3, 4, 5, or 6 (preferably 1, 2, 3, or 4); n–k=d; M is an element selected from Group 13 of the Periodic Table of the Elements, preferably boron or aluminum, and Q is independently a hydride, bridged or unbridged dialkylamido, halide, alkoxide, aryloxide, hydrocarbyl, substituted hydrocarbyl, halocarbyl, substituted halocarbyl, and halosubstituted-hydrocarbyl radicals, said Q having up to 20 carbon atoms with the proviso that in not more than 1 occurrence is Q a halide. Preferably, each Q is a fluorinated hydrocarbyl group having 1 to 20 carbon atoms, more preferably each Q is a fluorinated aryl group, and most preferably each Q is a pentafluoryl aryl group. Examples of suitable $A^{d-}$ also include diboron compounds as disclosed in U.S. Pat. No. 5,447,895, which is fully incorporated herein by reference.

Illustrative, but not limiting examples of boron compounds, which may be used as an activating co-catalyst are the compounds described as (and particularly those specifically listed as) activators in U.S. Pat. No. 8,658,556, which is incorporated herein by reference.

Most preferably, the ionic stoichiometric activator $Z_d^+$ ($A^{d-}$) is one or more of N,N-dimethylanilinium tetra(perfluorophenyl)borate, N,N-dimethylanilinium tetrakis(perfluoro-naphthyl)borate, N,N-dimethylanilinium tetrakis(perfluorobiphenyl)borate, N,N-dimethyl-anilinium tetrakis(3,5-bis(trifluoromethyl)phenyl)borate, triphenylcarbenium tetrakis(per-fluoronaphthyl)borate, triphenylcarbenium tetrakis(perfluorobiphenyl)borate, triphenyl-carbenium tetrakis(3,5-bis(trifluoromethyl)phenyl)borate, or triphenylcarbenium tetra(per-fluorophenyl)borate.

Bulky activators are also useful herein as NCAs. For a list of particularly useful NCA's referred to as Bulky activators please see U.S. Pat. No. 8,658,556, which is incorporated by reference herein.

In another embodiment, one or more of the NCA activators is chosen from the activators described in U.S. Pat. No. 6,211,105.

Preferred activators include N,N-dimethylanilinium tetrakis(perfluoronaphthyl)borate, N,N-dimethylanilinium tetrakis(perfluorobiphenyl)borate, N,N-dimethylanilinium tetrakis (perfluorophenyl)borate, N,N-dimethylanilinium tetrakis(3,5-bis(trifluoromethyl)phenyl)borate, triphenylcarbenium tetrakis(perfluoronaphthyl)borate, triphenylcarbenium tetrakis(perfluorobiphenyl)borate, triphenylcarbenium tetrakis(3,5-bis(trifluoromethyl)phenyl)borate, triphenyl-carbenium tetrakis(perfluorophenyl)borate, [Ph$_3$C$^+$][B(C$_6$F$_5$)$_4$$^-$], [Me$_3$NH$^+$][B(C$_6$F$_5$)$_4$$^-$]; 1-(4-(tris(pentafluorophenyl)borate)-2,3,5,6-tetrafluorophenyl) pyrrolidinium; and tetrakis(pentafluorophenyl)borate, 4-(tris(pentafluorophenyl)borate)-2,3,5,6-tetrafluoropyridine.

In a preferred embodiment, the activator comprises a triaryl carbonium (such as triphenylcarbenium tetraphenylborate, triphenylcarbenium tetrakis(pentafluorophenyl)borate, triphenylcarbenium tetrakis-(2,3,4,6-tetrafluorophenyl) borate, triphenylcarbenium tetrakis (perfluoronaphthyl) borate, triphenylcarbenium tetrakis(perfluorobiphenyl) borate, triphenyl-carbenium tetrakis(3,5-bis(trifluoromethyl)phenyl)borate).

In another embodiment, the activator comprises one or more of trialkylammonium tetrakis(pentafluorophenyl)borate, N,N-dialkylanilinium tetrakis(pentafluorophenyl)borate, N,N-dimethyl-(2,4,6-trimethylanilinium) tetrakis(pentafluorophenyl)borate, trialkylammonium tetrakis-(2,3,4,6-tetrafluorophenyl) borate, N,N-dialkylanilinium tetrakis-(2,3,4,6-tetrafluorophenyl)borate, trialkylammonium tetrakis (perfluoronaphthyl)borate, N,N-dialkylanilinium tetrakis (perfluoronaphthyl)borate, trialkylammonium tetrakis (perfluoro-biphenyl)borate, N,N-dialkylanilinium tetrakis (perfluorobiphenyl)borate, trialkylammonium tetrakis(3,5-bis(trifluoromethyl)phenyl)borate, N,N-dialkylanilinium tetrakis(3,5-bis(trifluoromethyl)phenyl)borate, N,N-dialkyl-(2,4,6-trimethylanilinium) tetrakis(3,5-bis(trifluoromethyl) phenyl)borate, di-(i-propyl)ammonium tetrakis(pentafluorophenyl)borate, (where alkyl is methyl, ethyl, propyl, n-butyl, sec-butyl, or t-butyl).

The typical activator-to-catalyst ratio, e.g., all NCA activators-to-catalyst ratio is about a 1:1 molar ratio. Alternate preferred ranges include from 0.1:1 to 100:1, alternately from 0.5:1 to 200:1, alternately from 1:1 to 500:1, alternately from 1:1 to 1000:1. A particularly useful range is from 0.5:1 to 10:1, preferably 1:1 to 5:1.

The catalyst compounds can be combined with combinations of alumoxanes and NCAs (see, for example, U.S. Pat. Nos. 5,153,157; 5,453,410; EP 0 573 120 B1; WO 94/07928; and WO 95/14044; which discuss the use of an alumoxane in combination with an ionizing activator).

6. Optional Scavengers and Chain Transfer Agents

In some embodiments, when using the complexes described herein, the catalyst system will additionally comprise one or more scavenging compounds. Here, the term scavenging compound means a compound that removes polar impurities from the reaction environment. These impurities adversely affect catalyst activity and stability. Typically, the scavenging compound will be an organometallic compound such as the Group 13 organometallic compounds of U.S. Pat. Nos. 5,153,157; 5,241,025; and WO-A-91/09882; WO-A-94/03506; WO-A-93/14132; and that of WO 95/07941. Exemplary compounds include alkyl aluminum compounds, such as triethylaluminum, triethyl borane, tri-iso-butyl aluminum, methyl alumoxane, iso-butyl alumoxane, and tri-n-octyl aluminum. Those scavenging compounds having bulky or $C_6$-$C_{20}$ linear hydrocarbyl substituents connected to the metal or metalloid center usually minimize adverse interaction with the active catalyst. Examples include triethylaluminum, but more preferably, bulky compounds such as tri-iso-butyl aluminum, tri-iso-prenyl aluminum, and long-chain linear alkyl-substituted aluminum compounds, such as tri-n-hexyl aluminum, tri-n-octyl aluminum, or tri-n-dodecyl aluminum can be used. When alumoxane is used as the activator, any excess over that needed for activation will scavenge impurities and additional scavenging compounds may be unnecessary. Alumoxanes also may be added in scavenging quantities with other activators, e.g., methylalumoxane, [Me$_2$HNPh]$^+$[B(pfp)$_4$]$^-$ or B(pfp)$_3$ (perfluorophenyl=pfp=$C_6F_5$).

Particularly useful scavengers are trialkyl- or triarylaluminum compounds, such as those represented by the formula: AlR$_3$, where R is a $C_1$ to $C_{20}$ group, such as a $C_1$ to $C_{20}$ alkyl or $C_1$ to $C_{20}$ aryl (such as methyl, ethyl, propyl, butyl, pentyl, hexyl, octyl, cyclopentyl, cyclohexyl, benzyl or phenyl groups and the like, including all their isomers, for example, tertiary butyl, isopropyl, and the like). Particularly useful scavengers include: trimethylaluminum, triethylaluminum, triisobutylaluminum, tri-n-hexylaluminum, tri-n-octylaluminum, and the like.

Chain transfer agents may also be used herein. Useful chain transfer agents that may also be used herein are typically a compound represented by the formula AlR$_3$, ZnR$_2$ (where each R is, independently, a $C_1$ to $C_{20}$, preferably $C_1$-$C_8$ alkyl or aryl radical, preferably methyl, ethyl, propyl, butyl, penyl, hexyl, octyl, benzyl, phenyl or an isomer thereof) or a combination thereof, such as diethyl zinc, trimethylaluminum, triisobutylaluminum, trin-octyl-aluminum, or a combination thereof. A combination of scavenger and chain transfer agent can also be useful, such as dialkyl zinc in combination with a trialkylaluminum. Diethylzinc in combination with one or more of trimethylaluminum, triisobutylaluminum, and tri-n-octylaluminum is also useful.

7. Optional Support Materials

In some embodiments herein, the catalyst system may comprise an inert support material. Preferably the supported material is a porous support material, for example, talc, and inorganic oxides. Other support materials include zeolites, clays, organoclays, or any other organic or inorganic support material and the like, or mixtures thereof.

Preferably, the support material is an inorganic oxide in a finely divided form. Suitable inorganic oxide materials for use in catalyst systems herein include Groups 2, 4, 13, and 14 metal oxides, such as silica, alumina, and mixtures thereof. Other inorganic oxides that may be employed either alone or in combination with the silica, or alumina are magnesia, titania, zirconia, and the like. Other suitable support materials, however, can be employed, for example, finely divided functionalized polyolefins, such as finely divided polyethylene. Particularly useful supports include magnesia, titania, zirconia, montmorillonite, phyllosilicate, zeolites, talc, clays, and the like. Also, combinations of these support materials may be used, for example, silica-chromium, silica-alumina, silica-titania, and the like. Preferred support materials include $Al_2O_3$, $ZrO_2$, $SiO_2$, and combinations thereof, more preferably $SiO_2$, $Al_2O_3$, or $SiO_2/Al_2O_3$.

It is preferred that the support material, most preferably an inorganic oxide, has a surface area in the range of from about 10 to about 700 $m^2$/g, pore volume in the range of from about 0.1 to about 4.0 cc/g and average particle size in the range of from about 5 to about 500 µm. More preferably, the surface area of the support material is in the range of from about 50 to about 500 $m^2$/g, pore volume of from about 0.5 to about 3.5 cc/g and average particle size of from about 10 to about 200 µm. Most preferably the surface area of the support material is in the range is from about 100 to about 400 $m^2$/g, pore volume from about 0.8 to about 3.0 cc/g and average particle size is from about 5 to about 100 µm. The average pore size of the support material is in the range of from 10 to 1000 Å, preferably 50 to about 500 Å, and most preferably 75 to about 350 Å. In some embodiments, the support material is a high surface area, amorphous silica (surface area=300 $m^2$/gm; pore volume of 1.65 $cm^3$/gm). Preferred silicas are marketed under the tradenames of DAVISON 948, DAVISON 952 or DAVISON 955 by the Davison Chemical Division of W.R. Grace and Company.

The support material should be dry, that is, free of absorbed water. Drying of the support material can be effected by heating or calcining at about 100° C. to about 1000° C., preferably at least about 600° C. When the support material is silica, it is heated to at least 200° C., preferably about 200° C. to about 850° C., and most preferably at about 600° C.; and for a time of about 1 minute to about 100 hours, from about 12 hours to about 72 hours, or from about 24 hours to about 60 hours. The calcined support material must have at least some reactive hydroxyl (OH) groups to produce supported catalyst systems. The calcined support material is then contacted with at least one polymerization catalyst comprising at least one catalyst compound and an activator.

The support material, having reactive surface groups, typically hydroxyl groups, is slurried in a non-polar solvent and the resulting slurry is contacted with a solution of a catalyst compound and an activator. In some embodiments, the slurry of the support material is first contacted with the activator for a period of time in the range of from about 0.5 hours to about 24 hours, from about 2 hours to about 16 hours, or from about 4 hours to about 8 hours. The solution of the catalyst compound is then contacted with the isolated support/activator. In some embodiments, the supported catalyst system is generated in situ (such as in the spiral heat exchanger). In alternate embodiment, the slurry of the support material is first contacted with the catalyst compound for a period of time in the range of from about 0.5 hours to about 24 hours, from about 2 hours to about 16 hours, or from about 4 hours to about 8 hours. The slurry of the supported catalyst compound is then contacted with the activator solution.

The mixture of the catalyst, activator, and support is heated to about 0° C. to about 70° C., preferably to about 23° C. to about 60° C., preferably at room temperature. Contact times typically range from about 0.5 hours to about 24 hours, from about 2 hours to about 16 hours, or from about 4 hours to about 8 hours.

The catalyst system may be dried and introduced into the spiral heat exchanger as a solid (such as a powder), suspended in mineral oil and introduced as a mineral oil slurry, combined with typical hydrocarbon solvent material (such as hexane, isopentane, etc.) and introduced as a suspension, or any other means typical in the art.

I. Additives

Other additives may also be used in the polymerization, as desired, such as one or more, scavengers, promoters, modifiers, chain transfer agents, co-activators, reducing agents, oxidizing agents, hydrogen, aluminum alkyls, or silanes.

Aluminum alkyl compounds which may be utilized as scavengers or co-activators include, for example, one or more of those represented by the formula $AlR_3$, where each R is, independently, a $C_1$-$C_8$ aliphatic radical, preferably methyl, ethyl, propyl, butyl, pentyl, hexyl octyl or an isomer thereof), especially trimethylaluminum, triethylaluminum, triisobutylaluminum, tri-n-hexylaluminum, tri-n-octylaluminum or mixtures thereof.

Alternately, little or no scavenger is used in the process to produce the polymer, such as ethylene polymer. Preferably, scavenger (such as trialkyl aluminum, $AlR_3$ as defined above) is present at zero mol %, alternately the scavenger is present at a molar ratio of scavenger metal to transition metal of less than 100:1, preferably less than 50:1, preferably less than 15:1, preferably less than 10:1.

Useful chain transfer agents that may also be used herein are typically a compound represented by the formula $AlR_3$, $ZnR_2$ (where each R is, independently, a $C_1$-$C_8$ aliphatic radical, preferably methyl, ethyl, propyl, butyl, pentyl, hexyl octyl or an isomer thereof) or a combination thereof, such as diethyl zinc, trimethylaluminum, triisobutylaluminum, tri-octylaluminum, or a combination thereof.

III. Removal of Contaminants

In another embodiment, processes for removing contaminants from a polyolefin are provided. The process comprises feeding to a separator a solution comprising the polyolefin as described herein (e.g., polyethylene, polypropylene), a solvent as described herein and unreacted hydrocarbon monomer as described herein (e.g., $C_2$ to $C_5$ olefins, $C_1$ to $C_5$ paraffins). The solution in the separator may be contacted with a stripping agent as described herein (e.g., $C_2$ to $C_{10}$ olefin such as ethylene and/or propylene) to remove the solvent and the unreacted hydrocarbon monomer under suitable conditions to form a first stream as described herein comprising molten polyolefin substantially free of the solvent and the unreacted hydrocarbon monomer; and a second stream as described herein comprising the solvent and the unreacted hydrocarbon monomer, wherein the stripping agent is non-polar and condensable as described herein. Preferably, the stripping agent flows in a direction countercurrent to a flow of the solution in the separator. The stripping agent may have any suitable flow rate as described herein, particularly at least about 800 kg/h.

The separator may be any suitable liquid vapor separator as described herein (e.g., a flash reactor). Preferably, the separator can be operated at a substantially constant pressure and optionally, under a vacuum. In particular, the separator may be conducted with a pressure of about 0.5 torr to about 300 torr, about 0.5 torr to about 200 torr, about 25 torr to about 300 torr, about 25 torr to about 200 torr, about 50 torr to about 300 torr, about 75 torr to about 250 torr, about 100 torr to about 250 torr, about 100 torr to about 250 torr or about 100 torr to about 200 torr. Additionally or alternatively, the separator may be conducted at a temperature of from about 100° C. to about 250° C., preferably from about 150° C. to about 250° C., preferably about 125° C. to about 225° C., preferably about 125° C. to about 200° C., or preferably about 150° C. to about 200° C. In particular, the separator may be operated at pressure of about 0.5 torr to about 200 torr or 100 torr to about 200 torr and a temperature of about 150° C. to about 250° C. or about 150° C. to about 200° C.

IV. System

In still another aspect, this disclosure relates to a system for producing a polyolefin, wherein the system comprises: a reactor for polymerizing a hydrocarbon monomer dissolved in a solvent in the presence of a catalyst system to produce a first effluent stream, wherein the reactor comprises: a feedstream in fluid connection with the reactor, wherein the feedstream comprises hydrocarbon monomer dissolved in the solvent; the catalyst system; and a first effluent stream in fluid connection with the reactor, wherein the first effluent stream comprises a solution of the polyolefin and the solvent; a first liquid vapor separator for producing a second effluent stream, wherein the first liquid vapor separator comprises: the first effluent stream in fluid connection with the first liquid vapor separator; and the second effluent stream in fluid connection with the first liquid vapor separator, wherein the second effluent stream comprises a solution having a higher concentration of the polyolefin and a lower concentration of the solvent than the first effluent stream; a second liquid vapor separator for producing a product stream and a recycle stream, wherein the second liquid vapor separator comprises: the second effluent stream in fluid connection with the second liquid vapor separator; a stripping agent stream in fluid connection with the second liquid vapor separator, wherein the stripping agent is non-polar and condensable; the product stream in fluid connection with the second liquid vapor separator, wherein the product stream comprises molten polyolefin substantially free of the solvent and the unreacted hydrocarbon monomer; and the recycle stream in fluid connection with the second liquid vapor separator, wherein the recycle stream comprises at least a portion of the solvent and the unreacted hydrocarbon monomer.

This invention also relates to a system for producing a polyolefin (typically polyethylene and/or polypropylene), wherein the system comprises: a reactor for polymerizing a hydrocarbon monomer (such as one or more $C_2$ to $C_{12}$ olefins) dissolved in a solvent in the presence of a catalyst system to produce a first effluent stream, wherein the reactor comprises: a feedstream in fluid connection with the reactor, wherein the feedstream comprises hydrocarbon monomer dissolved in the solvent; the catalyst system; and a first effluent stream in fluid connection with the reactor, wherein the first effluent stream comprises a solution of the polyolefin and the solvent; a first liquid vapor separator for producing a second effluent stream, wherein the first liquid vapor separator comprises: the first effluent stream in fluid connection with the first liquid vapor separator; and the second effluent stream in fluid connection with the first liquid vapor separator, wherein the second effluent stream comprises a solution having a higher concentration of the polyolefin and a lower concentration of the solvent than the first effluent stream; a second liquid vapor separator for producing a product stream and a recycle stream, wherein the second liquid vapor separator comprises: the second effluent stream in fluid connection with the second liquid vapor separator; a stripping agent stream (preferably comprising a $C_2$-$C_{10}$ olefin, such as ethylene and or propylene) in fluid connection with the second liquid vapor separator, wherein the stripping agent is non-polar and condensable; the product stream in fluid connection with the second liquid vapor separator, wherein the product stream comprises molten polyolefin substantially free of the solvent and the unreacted hydrocarbon monomer; and the recycle stream in fluid connection with the second liquid vapor separator, wherein the recycle stream comprises at least a portion of the solvent and the unreacted hydrocarbon monomer.

Optionally, an apparatus for purifying the recycle stream is not present or is present and comprises an atmospheric vent, a flare, a cooler and/or a compressor.

Usefully, the first stream may comprise at least about 98 wt % molten polyolefin and less than about 2.0 wt % solvent and unreacted hydrocarbon monomer.

Usefully, the first effluent stream may comprise a solution of the polyolefin in amount of about 10 wt % to about 30 wt % and the solvent and unreacted hydrocarbon monomer in an amount of about 70 wt % to about 90 wt %.

Usefully, the second effluent stream may comprise a solution of the polyolefin in amount of about 70 wt % to about 90 wt % and the solvent and unreacted hydrocarbon monomer in an amount of about 10 wt % to about 30 wt %.

Usefully, the first liquid vapor separator may have a pressure of about 2500 torr (333 kPa) to about 6000 torr (800 kPa) and a temperature of about 100° C. to about 200° C.

Usefully, the second liquid vapor separator may have a pressure of about 0.5 torr (66 pa) to about 200 torr (27 kPa) and a temperature of about 150° C. to about 250° C.

The following description is made with reference to FIG. 1, which provides an embodiment of an overall polymerization system 1 utilizing the processes described herein. A reactor (not shown) may be provided for polymerizing a hydrocarbon monomer (e.g., $C_2$ to $C_{40}$ olefins and, optionally, $C_1$ to $C_{12}$ paraffins) dissolved in a solvent in the presence of a catalyst system to produce a first effluent stream 2. The reactor may comprise a feedstream (not shown) in fluid connection with the reactor, wherein the feedstream comprises hydrocarbon monomer as described herein dissolved in the solvent as described herein. Additionally, the reactor includes a catalyst system as described herein (e.g., comprising a coordination catalyst, such as a metallocene compound, Ziegler-Natta catalyst, constrained geometry catalyst, and/or a post-metallocene compound), and a first effluent stream 2 in fluid connection with the reactor, wherein the first effluent stream 2 comprises a solution of polymer (e.g., polyolefin, such as polyethylene and/or polypropylene) and solvent. For example, the first effluent stream 2 may comprise a solution of polymer (e.g., polyolefin) in amount of about 10 wt % to about 30 wt % and solvent and/or unreacted hydrocarbon monomer in amount about 70 wt % to about 90 wt %. Optionally, a quench stream 3 may be added to the first effluent stream 2.

The polymerization system 1 may also include a first liquid vapor separator 6 for producing a second effluent stream 8 and a vapor stream 7. The first liquid vapor separator 6 may comprise the first effluent stream 2 in fluid connection with the first liquid vapor separator 6, the second effluent stream 8 in fluid connection with the first liquid vapor separator 6 and the vapor stream 7 in fluid connection with the first liquid vapor separator 6. The second effluent stream 8 comprises a solution having a higher concentration (e.g., about 70 wt % to about 90 wt %) of polymer (e.g., polyolefin) and a lower concentration (e.g., about 10 wt % to about 30 wt %) of the solvent and/or unreacted hydrocarbon monomer than the first effluent stream 2. The vapor stream 7 may comprise solvent and/or unreacted hydrocarbon monomer in a vapor state following the liquid vapor separation. Additionally, the first liquid vapor separator 6 may have a pressure and a temperature as described herein, e.g., a pressure of about 2500 torr (333 kPa) to about 6000 torr (800 kPa) and/or a temperature of about 100° C. to about 200° C.

Additionally, the polymerization system 1 preferably includes a second liquid vapor separator 13 for producing a first stream 14 as described herein and a recycle stream 15 (or second stream as described herein). The second liquid vapor separator 13 may comprise the second effluent stream 8 in fluid connection with the second liquid vapor separator 13 and a stripping agent stream 5 in fluid connection with the second liquid vapor separator 13. Optionally, the second effluent stream 8 may be heated in heat exchanger 10 and a heat exchanger 12 prior to introduction into the second liquid vapor separator 13. At least a portion of the second effluent stream 8 following heating in the heat exchanger 10 optionally may be recycled back into the first liquid vapor separator 6 as a recycle stream 11. Additionally, an antioxidant stream 4 comprising antioxidants described herein may be added to the second effluent stream 8 as well, optionally using a positive displacement pump 9. The stripping agent 5 entering the second liquid vapor separator 13 is non-polar and condensable as described herein (such as $C_2$ to $C_{10}$ olefins, such as ethylene and or propylene). Preferably, the stripping agent stream flows in a direction counter-current to a flow of the second effluent stream 8 in the second liquid vapor separator 13. Additionally, the second liquid vapor separator 13 may have a pressure and a temperature as described herein, e.g., a pressure of about 0.5 torr (66 Pa) to about 200 torr (27 kPa) and/or a temperature of about 150° C. to about 250° C. The first stream 14 in fluid connection with the second liquid vapor separator 13 may comprise molten polymer (e.g., polyolefin) substantially free of the solvent and the unreacted hydrocarbon monomer and is optionally transferred via positive displacement pump 16 to finishing (e.g., pelletization, etc.). For example, the first stream 14 may comprise at least about 98 wt % molten polymer (e.g., polyolefin) and less than about 2.0 wt % solvent and unreacted hydrocarbon monomer. The recycle stream 15 in fluid connection with the second liquid vapor separator 13 may comprise at least a portion of the solvent and the unreacted hydrocarbon monomer in a vapor state following the liquid vapor separation.

Additionally or alternatively, an apparatus (e.g., atmospheric vent, flare, cooler, compressor) for purifying the recycle stream 15 may be present. The recycle stream 15 following a series of compressing and cooling steps in compressors 18, 23 and 25 and coolers 24 and 26 may be introduced into the reactor (not shown) during the polymerization, typically using a vacuum pump 17. Additionally, vapor stream 7 may be cooled in chiller 19 and condensed in condenser 20 to form a condensed stream 21 and stream 22. Condensed stream 21 may optionally be introduced into recycle stream 15 and undergo a series of compressing and cooling steps in compressors 18, 23 and 25 and coolers 24 and 26 before being introduced into the reactor during the polymerization. In a preferred embodiment, an apparatus (e.g., atmospheric vent, flare, cooler, compressor) for purifying the recycle stream 15 may not be present.

In an embodiment of the processes and systems disclosed herein, the polymer systems described using the stripping agents described herein can be simulated on a computer using process simulation software in order to generate process simulation data in a human-readable form (i.e., a computer printout or data displayed on a screen, a monitor, or other viewing device). The simulation data can then be used to manipulate the operation of the polymer production system and/or design the physical layout of a polymer production facility. In one embodiment, the simulation results can be used to design a polymer production facility or expand an existing facility to integrate spiral heat exchanger(s). In another embodiment, the simulation results can be used to optimize the polymer production according to one or more operating parameters, such as varying the flow rate of the stripping agent. Examples of suitable software for producing the simulation results include commercial simulation software Aspen Plus v8.8 (34.0.0.110) with Aspen Polymers Module integrated from Aspen Technology, Inc., and PRO/II® from Simulation Sciences Inc.

In a preferred embodiment of the invention, the polymerization reactor comprises one or more spiral heat exchangers as described in U.S. Ser. No. 62/234,518, filed Sep. 29, 2015, which is incorporated by reference herein.

Experimental

The polymerization process to produce polyolefin is simulated using the commercialized simulation software Aspen Plus v8.8 (34.0.0.110) with Aspen Polymers Plus in the Aspen Engineering Suite. Flashes are modeled as steady-state, isothermal vapor-liquid separations, using the PC-SAFT equation of state for the thermodynamic model.

Figure 2:
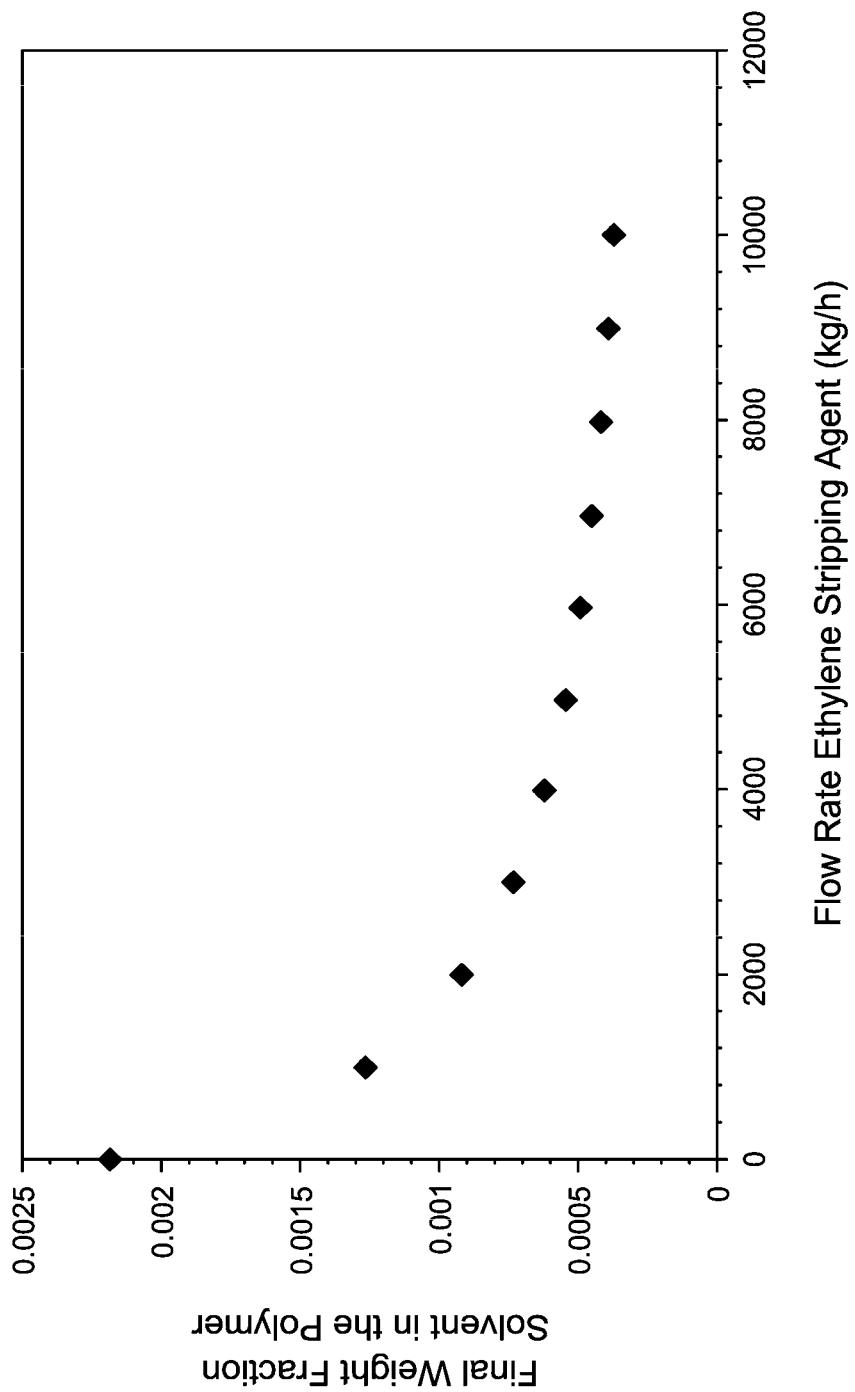
FIG. 2 illustrates a relationship between flow rate of stripping agent and the final residual solvent content in polymer.

FIG. 2 shows the predicted equilibrium content of a solvent, ethylene-in-2-methylpentane, in final polymer as a function of flow rate of an ethylene stripping agent using Aspen® simulation software. The flow-rate to a liquid vapor separator of stream containing 85% polymer and 14% solvent is 26000 kg/h. The system pressure is 200 torr (27 kPa) and the inlet temperature is 220° C. At the same system pressure, the residual solvent concentration in the polymer can be greatly reduced by even minor amounts of added ethylene.

All documents described herein are incorporated by reference herein, including any priority documents and/or testing procedures to the extent they are not inconsistent with this text. As is apparent from the foregoing general description and the specific embodiments, while many specific embodiments have been illustrated and described, various modifications can be made without departing from the spirit and scope of the disclosure. Accordingly, it is not intended that the claimed invention be limited thereby. Likewise, the term "comprising" is considered synonymous with the term "including." Likewise, whenever a composition, an element or a group of elements is preceded with the transitional phrase "comprising," it is understood that we also contemplate the same composition or group of elements with transitional phrases "consisting essentially of," "consisting of," "selected from the group consisting of," or "is" preceding the recitation of the composition, element, or elements, and vice versa.

What is claimed is:

1. A process for producing a polyolefin, wherein the process comprises:

polymerizing hydrocarbon monomer dissolved in a solvent in the presence of a catalyst system under conditions to obtain a first effluent comprising a solution of the polyolefin and the solvent;

performing a first liquid vapor separation in a first vessel on the first effluent to produce a second effluent comprising a solution having a higher concentration of the polyolefin and a lower concentration of the solvent than the first effluent; and performing a second liquid vapor separation in a second vessel on the second effluent to produce:
a first stream comprising molten polyolefin substantially free of the solvent and unreacted hydrocarbon monomer; and
a second stream comprising the solvent and the unreacted hydrocarbon monomer;
wherein the second liquid vapor separation comprises adding a stripping agent to the second effluent in the second vessel, wherein the stripping agent is non-polar and condensable.

2. The process of claim 1 further comprising recycling of the second stream for addition during to the polymerization reaction.

3. The process of claim 2, wherein the recycling of the second stream does not include purification of the second stream prior to addition to the polymerization reaction.

4. The process of claim 2, wherein recycling of the second stream does not include purification of the second stream prior to addition to the polymerization reaction by one or more of atmospheric venting, flaring, cooling and compressing.

5. The process of claim 1, wherein the second liquid-vapor separation is performed at a substantially constant pressure.

6. The process of claim 1, wherein the stripping agent flows in a direction counter-current to a flow of the second effluent in the second vessel.

7. The process of claim 1, wherein the stripping agent has a flow rate of at least about 800 kg/h.

8. The process of claim 1, wherein the catalyst system comprises a coordination catalyst and an activator.

9. The process of claim 1, wherein the first stream comprises at least about 98 wt % molten polyolefin and less than about 2.0 wt % solvent and unreacted hydrocarbon monomer.

10. The process of claim 1, wherein the polyolefin comprises polyethylene and/or polypropylene.

11. The process of claim 1, wherein the stripping agent comprises a $C_2$ to $C_{10}$ olefin.

12. The process of claim 1, wherein the stripping agent comprises ethylene and/or propylene.

13. The process of claim 1, wherein the hydrocarbon monomer comprises $C_2$ to $C_{12}$ olefins.

14. The process of claim 1, wherein the first effluent comprises a solution of the polyolefin in amount of about 10 wt % to about 30 wt % and the solvent and unreacted hydrocarbon monomer in an amount of about 70 wt % to about 90 wt %.

15. The process of claim 1, wherein the second effluent comprises a solution of the polyolefin in amount of about 70 wt % to about 90 wt % and the solvent and unreacted hydrocarbon monomer in an amount of about 10 wt % to about 30 wt %.

16. The process of claim 1, wherein the first liquid vapor separation is operated at a pressure of about 2500 torr (333 kPa) to about 6000 torr (800 kPa) and a temperature of about 100° C. to about 200° C.

17. The process of claim 1, wherein the second liquid vapor separation is operated at a pressure of about 100 torr (13 kPa) to about 200 torr (27 kPa) and a temperature of about 150° C. to about 200° C.

18. A process for removing contaminants from a polyolefin, wherein the process comprises:
polymerizing the polyolefin in a reactor;
feeding to a separator a solution comprising the polyolefin, a solvent and unreacted hydrocarbon monomer;
contacting the solution in the separator with a stripping agent to remove the solvent and the unreacted hydrocarbon monomer to form:
a first stream comprising molten polyolefin substantially free of the solvent and the unreacted hydrocarbon monomer; and
a second stream comprising the solvent and the unreacted hydrocarbon monomer;
wherein the stripping agent is non-polar and condensable; and
recycling the second stream to the reactor.

19. The process of claim 18, wherein the stripping agent flows in a direction counter-current to a flow of the solution in the separator.

20. The process of claim 18, wherein the stripping agent has a flow rate of at least about 800 kg/h.

21. The process of claim 18, wherein the first stream comprises at least about 98 wt % molten polyolefin and less than about 2.0 wt % solvent and unreacted hydrocarbon monomer.

22. The process of claim 18, wherein the polyolefin comprises polyethylene and/or polypropylene.

23. The process of claim 18, wherein the stripping agent comprises a $C_2$ to $C_{10}$ olefin.

24. A system for producing a polyolefin, wherein the system comprises: a reactor for polymerizing a hydrocarbon monomer dissolved in a solvent in the presence of a catalyst system to produce a first effluent stream, wherein the reactor comprises: a feedstream in fluid connection with the reactor, wherein the feedstream comprises hydrocarbon monomer dissolved in the solvent; the catalyst system; and a first effluent stream in fluid connection with the reactor, wherein the first effluent stream comprises a solution of the polyolefin and the solvent; a first liquid vapor separator for producing a second effluent stream, wherein the first liquid vapor separator comprises: the first effluent stream in fluid connection with the first liquid vapor separator; and the second effluent stream in fluid connection with the first liquid vapor separator, wherein the second effluent stream comprises a solution having a higher concentration of the polyolefin and a lower concentration of the solvent than the first effluent stream; a second liquid vapor separator for producing a product stream and a recycle stream, wherein the second liquid vapor separator comprises: the second effluent stream in fluid connection with the second liquid vapor separator; a stripping agent stream in fluid connection with the second liquid vapor separator, wherein the stripping agent is non-polar and condensable; the product stream in fluid connection with the second liquid vapor separator, wherein the product stream comprises molten polyolefin substantially free of the solvent and the unreacted hydrocarbon monomer; and the recycle stream in fluid connection with the second liquid vapor separator, wherein the recycle stream comprises at least a portion of the solvent and the unreacted hydrocarbon monomer.

25. The system of claim 24, wherein an apparatus for purifying the recycle stream is not present.

* * * * *